US006526430B1

(12) United States Patent
Hung et al.

(10) Patent No.: US 6,526,430 B1
(45) Date of Patent: Feb. 25, 2003

(54) RECONFIGURABLE SIMD COPROCESSOR ARCHITECTURE FOR SUM OF ABSOLUTE DIFFERENCES AND SYMMETRIC FILTERING (SCALABLE MAC ENGINE FOR IMAGE PROCESSING)

(75) Inventors: Ching-Yu Hung, Plano, TX (US); Leonardo W. Estevez, Dallas, TX (US); Wissam A. Rabadi, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/411,124

(22) Filed: Oct. 4, 1999

(51) Int. Cl.⁷ .............................. G06F 7/38; G06F 17/10
(52) U.S. Cl. ........................ 708/523; 708/316; 708/524
(58) Field of Search ................................ 708/490, 523, 708/603, 524, 316

(56) References Cited

U.S. PATENT DOCUMENTS

| | | | | |
|---|---|---|---|---|
| 5,175,702 A | * | 12/1992 | Beraud et al. ............... | 708/523 |
| 5,179,531 A | * | 1/1993 | Yamaki ....................... | 708/490 |
| 5,278,781 A | * | 1/1994 | Aono et al. .................. | 708/523 |

\* cited by examiner

*Primary Examiner*—Tan V. Mai
(74) *Attorney, Agent, or Firm*—Robert D. Marshall, Jr.; W. James Brady, III; Frederick J. Telecky, Jr.

(57) ABSTRACT

The proposed architecture is integrated onto a Digital Signal Processor (DSP) as a coprocessor to assist in the computation of sum of absolute differences, symmetrical row/column Finite Impulse Response (FIR) filtering with a downsampling (or upsampling) option, row/column Discrete Cosine Transform (DCT)/Inverse Discrete Cosine Transform (IDCT), and generic algebraic functions. The architecture is called IPP, which stands for image processing peripheral, and consists of 8 multiply-accumulate hardware units connected in parallel and routed and multiplexed together. The architecture can be dependent upon a Direct Memory Access (DMA) controller to retrieve and write back data from/to DSP memory without intervention from the DSP core. The DSP can set up the DMA transfer and IPP/DMA synchronization in advance, then go on its own processing task. Alternatively, the DSP can perform the data transfers and synchronization itself by synchronizing with the IPP architecture on these transfers. This architecture implements 2-D filtering, symmetrical filtering, short filters, sum of absolute differences, and mosaic decoding more efficiently than the previously disclosed architectures of the prior art.

8 Claims, 20 Drawing Sheets

RECONFIGURABLE SIMD COPROCESSOR ARCHITECTURE FOR SUM OF ABSOLUTE DIFFERENCES AND SYMMETRIC FILTERING (SCALABLE MAC ENGINE FOR IMAGE PROCESSING)

FIELD OF THE INVENTION

This invention relates in general to signal processing and more specifically to Single Instruction Multiple Data (SIMD) coprocessor architectures providing for faster image and video signal processing, including one and two dimensional filtering, transforms, and other common tasks.

BACKGROUND OF THE INVENTION

A problem which has arisen in image processing technology is that two-dimensional (2-D) filtering has a different addressing pattern than one dimensional (1-D) filtering. Previous DSP processors and coprocessors, designed for 1-D, may have to be modified to process 2-D video signals. The end desired goal is to enable a digital signal processor (DSP) or coprocessor to perform image and video processing expediently. In image processing, the most useful operation is 1-D and 2-D filtering, which requires addressing the 2-D data and 1-D or 2-D convolution coefficients. When the convolution coefficients are symmetrical, architecture that makes use of the symmetry can reduce computation time roughly in half. The primary bottleneck identified for most video encoding algorithms is that of motion estimation. The problem of motion estimation may be addressed by first convolving an image with a kernel to reduce it into lower resolution images. These images are then reconvolved with the same kernel to produce even lower resolution images. The sum of absolute differences may then be computed within a search window at each level to determine the best matching subimage for a subimage in the previous frame. Once the best match is found at lower resolution, the search is repeated within the corresponding neighborhood at higher resolutions. In view of the above, a need to produce an architecture capable of performing the 1-D/2-D filtering, preferably symmetrical filtering as well, and the sum of absolute differences with equal efficiency has been generated. Previously, specialized hardware or general purpose DSPs were used to perform the operations of summing of absolute differences and symmetric filtering in SIMD coprocessor architectures. Intel's MMX technology is similar in concept although much more general purpose. Copending applications filed on Feb. 4, 1998, titled "Reconfigurable Multiply-accumulate Hardware Co-processor Unit", Provisional Application No. 60/073,668 now U.S. Pat. No. 6,298,366 and "DSP with Efficiently Connected Hardware Coprocessor", Provisional Application No. 60/073,641 now U.S. Pat. No. 6,256,724 embody host processor/coprocessor interface and efficient Finite Impulse Response/Fast Fourier Transform (FIR/FFT) filtering implementations that this invention is extending to several other functions.

SUMMARY OF THE INVENTION

The proposed architecture is integrated onto a Digital Signal Processor (DSP) as a coprocessor to assist in the computation of sum of absolute differences, symmetrical row/column Finite Impulse Response (FIR) filtering with a downsampling (or upsampling) option, row/column Discrete Cosine Transform (DCT)/Inverse Discrete Cosine Transform (IDCT), and generic algebraic functions. The architecture is called IPP, which stands for image processing peripheral, and consists of 8 multiply-accumulate hardware units connected in parallel and routed and multiplexed together. The architecture can be dependent upon a Direct Memory Access (DMA) controller to retrieve and write back data from/to DSP memory without intervention from the DSP core. The DSP can set up the DMA transfer and IPP/DMA synchronization in advance, then go on its own processing task. Alternatively, the DSP can perform the data transfers and synchronization itself by synchronizing with the IPP architecture on these transfers. This architecture implements 2-D filtering, symmetrical filtering, short filters, sum of absolute differences, and mosaic decoding more efficiently than the previously disclosed Multi-MAC coprocessor architecture (U.S. Pat. No. 6,298,366 titled "Reconfigurable Multiply-Accumulate Hardware Co-Processor Unit", filed on Jan. 4, 1998 and incorporated herein by reference). This coprocessor will greatly accelerate the DSP's capacity to perform specifically common 2-D signal processing tasks. The architecture is also scalable providing an integer speed up in performance for each additional Single Instruction Multiple Data (SIMD) block added to the architecture (provided the DMA can handle data transfers among the DSP and the coprocessors at a rapid enough rate). This technology could greatly accelerate video encoding. This architecture may be integrated onto existing DSPs such as the Texas Instruments TMS320C54x and TMS320C6x. Each of these processors already contains a DMA controller for data transfers.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention. These and other aspects of this invention are illustrated in the drawings, in which:

FIG. 4 illustrates an alternative embodiment of the combination of FIG. 1 including two co-processors with a private bus in between;

DETAILED DESCRIPTION OF THE PREFERRED EMBODIMENTS

Figure 1:
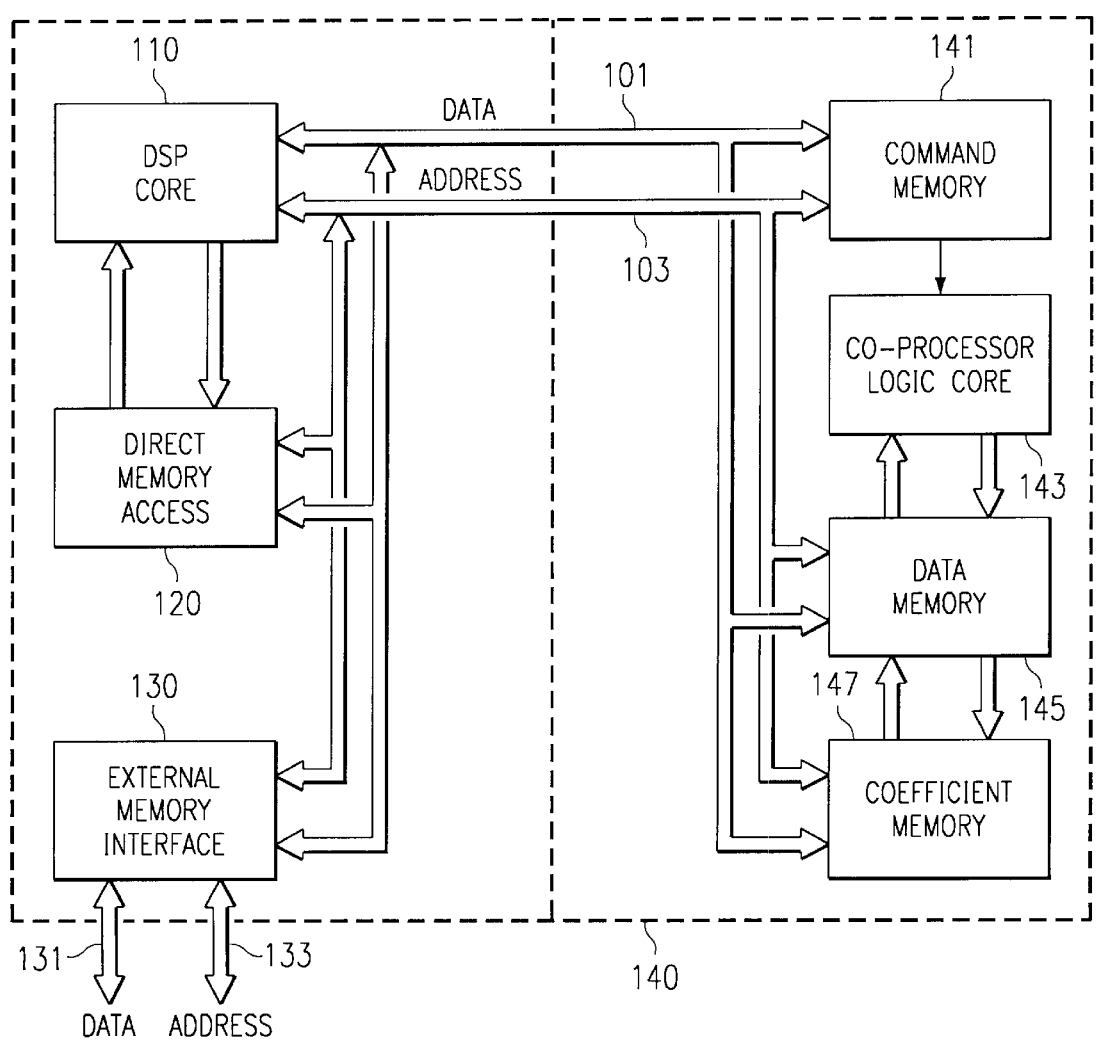
FIG. 1 illustrates the combination of a digital signal processor core and a reconfigurable hardware co-processor in accordance with this invention, with the coprocessor closely coupled to the internal bus of the DSP.

FIG. 1 illustrates circuit 100 including digital signal processor core 110 and a reconfigurable IPP hardware co-processor 140. FIG. 1 is the same FIG. 1 as in U.S. Pat. No. 6,298,366, titled "Reconfigurable Multiple Multiply-Accumulate Hardware Co-processor Unit" assigned to the same assignee, the co-processor of which a preferred embodiment of this invention is made. In accordance with a preferred embodiment of this invention, these parts are formed in a single integrated circuit (IC). Digital signal processor core 110 may be of convention design. The IPP is a memory mapped peripheral. Transferring data between IPP's and DSP's working memory can be carried out via the Direct Memory Access (DMA) controller 120 without intervention from the digital signal processor core 110. Alternatively, the DSP core 110 can handle data transfer itself via direct load/store to IPP's working memory 141, 145 and 147. A combination of the two transfer mechanisms is also possible, as the DMA can handle large data/coefficient transfers more efficiently, and the DSP can directly write out short commands to IPP command memory 141 more efficiently.

The reconfigurable IPP hardware co-processor 140 has a wide range of functionality and supports symmetrical/asymmmetrical row/column filtering, 2-D filtering, sum of absolute differences, row/column DCT/IDCT and generic linear algebraic functions. Symmetrical row/column filtering is frequently used in up/down sampling to resize images to fit display devices. Two-dimensional filtering is often used for demosaic and for image enhancement in digital cameras. Sum of absolute differences is implemented in MPEG video encoding and H.263 and H.323, encoding standards for the telephone line video conferencing. Row/column DCT/IDCT is implemented in JPEG image encoding/decoding and MPEG video encoding/decoding. Generic linear algebraic functions, including array addition/subtraction and scaling are frequently used in imaging and video applications to supplement the filtering and transform operations. For example, digital cameras require scaling of pixels to implement gain control and white balancing.

In the preferred embodiment, reconfigurable IPP hardware co-processor 140 can be programmed to coordinate with direct memory access circuit 120 for autonomous data transfers independent of digital signal processor core 110. External memory interface 130 serves to interface the internal data bus 101 and address bus 103 to their external counterparts external data bus 131 and external address bus 133, respectively. External memory interface 130 is conventional in construction. Integrated circuit 100 may optionally include additional conventional features and circuits. Note particularly that the addition of cache memory to integrated circuit 100 could substantially improve performance. The parts illustrated in FIG. 1 are not intended to exclude the provision of other conventional parts. Those conventional parts illustrated in FIG. 1 are merely the parts most effected by the addition of reconfigurable hardware co-processor 140.

Reconfigurable IPP hardware co-processor 140 is coupled to other parts of integrated circuit 100 via a data bus 101 and address bus 103. Reconfigurable IPP hardware co-processor 140 includes command memory 141, co-processor logic core 143, data memory 145, and coefficient memory 147.

Command memory 141 serves as the conduit by which digital signal processor core 110 controls the operations of reconfigurable hardware co-processor 140. Co-processor logic core 143 is responsive to commands stored in command memory 141 which form a command queue to perform co-processing functions. These co-processing functions involve exchange of data between co-processor logic core 143 and data memory 145 and coefficient memory 147. Data memory 145 stores the input data processed by reconfigurable hardware co-processor 140 and further stores the resultant of the operations of reconfigurable hardware co-processor 140. Coefficient memory 147 stores the unchanging or relatively unchanging process parameters called coefficients used by co-processor logic core 143. Though data memory 145 and coefficient memory 147 have been shown as separate parts, it would be easy to employ these merely as different portions of a single, unified memory. As will be shown below, for the multiple multiply accumulate co-processor described, it is best if such a single unified memory has two read ports for reading data and coefficients and one write port for writing output data. As multiple-port memory takes up more silicon area than single-port memory of the same capacity, the memory system can be partitioned to blocks to achieve multiple access points. With such memory configuration, it is desirable to equip IPP with memory arbitration and stalling mechanism to deal with memory access conflicts. It is believed best that the memory accessible by reconfigurable IPP hardware co-processor 140 be located on the same integrated circuit in physical proximity to co-processor logic core 143. This physical closeness is needed to accommodate the wide memory buses required by the desired data throughput of co-processor logic core 143.

Figure 2:
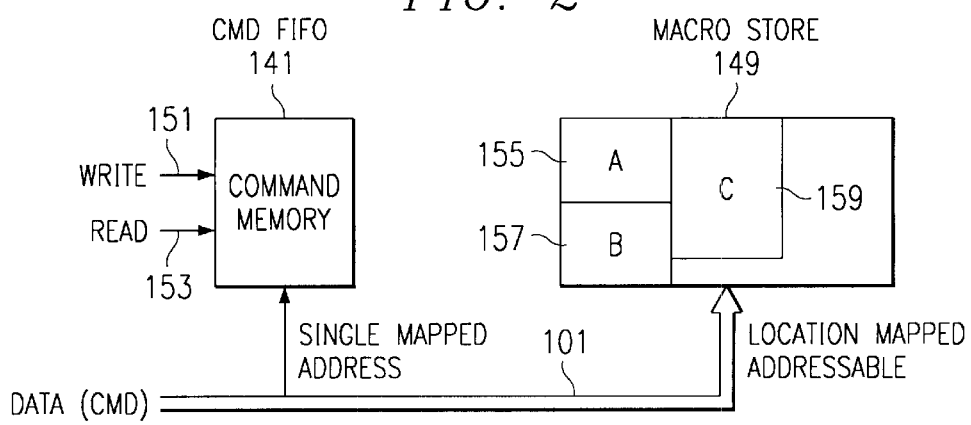
FIG. 2 illustrates the memory map logical coupling between the digital signal processor core and the reconfigurable hardware co-processor of this invention.

FIG. 2 illustrates the memory mapped interface between digital signal processor core 110 and reconfigurable IPP hardware coprocessor 140. Digital signal processor core 110 controls reconfigurable IPP hardware coprocessor 140 via command memory 141. In the preferred embodiment, command memory 141 is a first-in-first-out (FIFO) memory with a command queue. The write port of command memory 141 is memory mapped into a single memory location within the address space of digital signal processor core 110. Thus digital signal processor core 110 controls reconfigurable IPP hardware co-processor 140 by writing commands to the address serving as the input to command memory 141. Command memory 141 preferably includes two circularly oriented pointers. The write pointer 151 points to the location within command memory 141 wherein the next received command is to be stored. Each time there is a write to the predetermined address of command memory 141, write pointer selects the physical location receiving the data. Following such a data write, write pointer 151 is updated to point to the next physical location within command memory 141. Write pointer 151 is circularly oriented in that it wraps around from the last physical location to the first physical location. Reconfigurable IPP hardware co-processor 140 reads commands from command memory 141 in the same order as they are received (FIFO) using read pointer 153. Read pointer 153 points to the physical location with command memory 141 storing the next command to be read. Read pointer 153 is updated to reference the next physical location within command memory 141 following each such read. Note that read pointer 153 is also circularly oriented and wraps around from the last physical location to the first physical location. Command memory 141 includes a feature preventing write pointer 151 from passing read pointer 153. This may take place, for example, by refusing to write and sending a memory fault signal back to digital signal processor core 110 when write pointer 151 and read pointer 153 reference the same physical location. Thus the FIFO buffer of command memory 141 can be full and not accept additional commands.

Many digital signal processing tasks will use plural instances of similar functions. For example, the process may include several filter functions. Reconfigurable IPP hardware co-processor 140 preferably has sufficient processing capability to perform all of these filter functions in real time. The macro store area 149 can be used to store common function in form of subroutines so that invoking these functions takes just a "call subroutine" command in the command queue 141. This reduces traffic on the command memory and potentially memory requirement on the command memory as a whole. FIG. 2 illustrates 3 subroutines A, B, and C residing on the macro store area 149, with each subroutine ending with a "return" command.

Alternate to the command FIFO/macro store combination is static command memory contents that DSP set up initially. The command memory can hold multiple command sequences, each ending with a "sleep" command. DSP instructs IPP to execute a particular command sequence by writing the starting address of the sequence to an IPP control register. IPP executes the specified commands, until encountering the sleep command, when it goes into standby mode waiting for further instruction from the DSP. Data memory 145 and coefficient memory 147 can both be mapped within the Data address space of digital signal processor core 110. As illustrated in FIG. 2, Data bus 101 is bidirectionally coupled to memory 149. In accordance with the alternative embodiment noted above, both data memory 145 and coefficient memory 147 are formed as a part of memory 149. Memory 149 is also accessible by co-processor logic core 143(not illustrated in FIG. 2). FIG. 2 illustrates three circumscribed areas of memory within memory 149. As will be further described below, reconfigurable hardware co-processor 140 performs several functions employing differing memory areas.

Integrated circuit 100 operates as follows. Either digital signal processor core 110 or DMA controller 120 control the data and coefficients used by reconfigurable IPP hardware co-processor 140 by loading the data into data memory 145 and the coefficients into coefficient memory 147 or, alternatively, both the data and the coefficients into unified memory 149. Digital signal processor core 110 may be programmed to perform this data transfer directly, or alternatively, digital signal processor core 110 may be programmed to control DMA controller 120 to perform this data transfer. Particularly for audio or video processing applications, the data stream is received at a predictable rate and from a predictable device. Thus it would be typically efficient for digital processor core 110 to control DMA controller 120 to make transfers from external memory to memory accessible by reconfigurable hardware co-processor 140.

Following the transfer of data to be processed, digital signal processor core 110 signals reconfigurable IPP hardware co-processor core 140 with the command for the desired signal processing algorithm. As previously stated, commands are sent to a reconfigurable IPP hardware co-processor 140 by a memory write to a predetermined address within Command Queue 141. Received commands are stored in Command Queue 141 on a first-in-first-out basis. Each computational command of reconfigurable IPP co-processor preferable includes a manner to specify the particular function to be performed. In the preferred embodiment, reconfigurable hardware co-processor is constructed to be reconfigurable. Reconfigurable IPP hardware co-processor has a set of functional units, such as multipliers and adders, that can be connected together in differing ways to perform different but related functions. The set of related functions selected for each reconfigurable hardware co-processor will be based upon a similarity of the mathematics of the functions. This similarity in mathematics enables similar hardware to be reconfigured for the plural functions. The command may indicate the particular computation via an opcode in the manner of data processor instructions.

Each computational command includes a manner of specifying the location of the input data to be used by the computation. There are many suitable methods of designating data space. For example, the command may specify a starting address and number of data words or samples within the block. The data size may be specified as a parameter or it may be specified by the op code defining the computation type. As a further example, the command may specify the data size, the starting address and the ending address of the input data. Note that known indirect methods of specifying where the input data is stored may be used. The command may include a pointer to a register or a memory location storing any number of these parameters such as start address, data size, and number of samples within the Data block and end address.

Each computational command must further indicate the memory address range storing the output data of the particular command. This indication may be made by any of the methods listed previously with regard to the locations storing the input data. In many cases the computational function will be a simple filter function and the amount of output data following processing will be about equivalent to the amount of input data. In other cases, the amount of output data may be more or less than the amount of input data. In any event, the amount of resultant data is known from the amount of input Data and the type of computational function requested. Thus merely specifying the starting address provides sufficient information to indicate where all the resultant data is to be stored. It is feasible to store output data in a destructive manner over-writing input data during processing. Alternatively, the output data may be written to a different portion of memory and the input data preserved at least temporarily. The selection between these alternatives may depend upon whether the input data will be reused.

Figure 3:
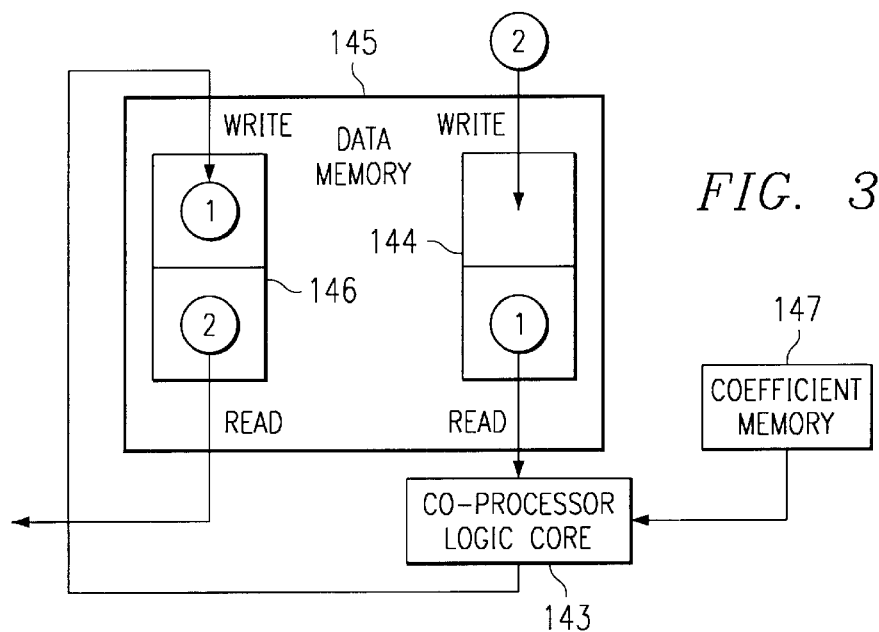
FIG. 3 illustrates a manner of using the reconfigurable IPP hardware co-processor of this invention.

FIG. 3 illustrates one useful technique involving alternatively employing two memory areas. One memory area 145 stores the input data needed for co-processor function. The relatively constant coefficients are stored in coefficient memory 147. The input data is recalled for use by co-processor logic core 143(1 read) from a first memory area 144 of the data memory 145. The output data is written into the second memory area 146 of the data memory(1 write). Following use of the data memory area, direct memory access circuit 120 writes the data into the first memory area 144 for the next block, overwriting the data previously used (2 write). At the same time, direct memory access circuit 120 reads data from second memory area 146 ahead of it being overwritten by reconfigurable hardware co-processor 140 (2 read). These two memory areas for input Data and for resultant data could be configured as circular buffers. In a product that requires plural related functions, separate memory areas defined as circular buffers can be employed. One memory area configured as a circular buffer will be allocated to each separate function.

The format of computational commands preferably closely resembles the format of a subroutine call instruction in a high level language. That is, the command includes a command name similar in function to the subroutine name specifying the particular computational function to be performed. Each command also includes a set of parameters specifying available options within the command type. For example, the following list of computational commands and the various parameters:

Row_filter(us, ds, length, block, data_addr, coef_addr, outp_addr)
Column_filter(us, ds, length, block, data_addr, coef_addr, outp_addr)
Row_filter_sym(us, ds, length, block, data_addr, coef_addr, outp_addr)
Sum_abs_diff(length, data_addr1, data_addr2, outp_addr)
Row_DCT(data_addr, outp_addr), Row_IDCT, Column_DCT, Column_IDCT
Vector_add(length, data_addr1, data_addr2, outp_addr)

These parameters may take the form of direct quantities or variables, which are pointers to registers or memory locations storing the desired quantities. The number and type of these parameters depends upon the command type. This subroutine call format is important in reusing programs written for digital signal processor core 110. Upon use, the programmer or compiler provides a stub subroutine to activate reconfigurable IPP hardware co-processor 140. This stub subroutine merely receives the subroutine parameters and forms the corresponding co-processor command using these parameters. The stub subroutine then writes this command to the predetermined memory address reserved for command transfers to reconfigurable hardware co-processor 140 and then returns. This invention envisions that the computational capacity of digital signal processor cores will increase regularly with time. Thus the processing requirements of a particular product may require the combination of digital signal processor core 110 and reconfigurable IPP hardware co-processor 140 at one point in time. At a later point in time, the available computational capacity of an instruction set digital signal processor core may increase so that the functions previously requiring a reconfigurable IPP hardware co-processor may be performed in software by the digital signal processor core. The prior program code for the product may be easily converted to the new, more powerful digital signal processor. This is achieved by providing independent subroutines for each of the commands supported by the replaced reconfigurable hardware co-processor. Then each place where the original program employs the subroutine stub to transmit a command is replaced by the corresponding subroutine call. Extensive reprogramming is thus avoided.

Following completion of processing on one block of data, the data may be transferred out of data memory 145. This second transfer can take place either by direct action of digital signal processor core 110 reading the data stored at the output memory locations or through the aid of direct memory access circuit 120. This output data may represent the output of the process. In this event, the data is transferred to a utilization device. Alternatively, the output data of reconfigurable IPP hardware co-processor 140 may represent work in progress. In this case, the data will typically be temporarily stored in memory external to integrated circuit 100 for later retrieval and further processing.

Reconfigurable IPP hardware co-processor 140 is then ready for further use. This further use may be additional processing of the same function. In this case, the process described above is repeated on a new block of data in the same way. This further use may be processing of another function. In this case, the new block of data must be loaded into memory accessible by reconfigurable IPP hardware co-processor 140, the new command loaded and then the processed data read for output or further processing.

Reconfigurable IPP hardware co-processor 140 preferably will be able to perform more than one function of the product algorithm. The advantage of operating on blocks of data rather than discrete samples will be evident when reconfigurable IPP hardware co-processor 140 operates in such a system. As an example, suppose that reconfigurable IPP hardware co-processor 140 performs three functions, A, B and C. These functions may be sequential or they may be interleaved with functions performed by digital signal processor core 110. Reconfigurable IPP hardware co-processor 140 first performs function A on a block of data. This function is performed as outlined above. Digital signal processor core 110 either directly or by control of direct memory access circuit 120 loads the input data into data memory 145. Upon issue of the command for configuration for function A which specifies the amount of data to be processed, reconfigurable IPP hardware co-processor 140 performs function A and stores the resultant data back into the portion of memory 145 specified by the command. A similar process occurs to cause reconfigurable IPP hardware co-processor 140 to perform function B on data stored in memory 145 and return the result to memory 145. The performance of function A may take place upon Data blocks having a size unrelated to the size of the Data blocks for function B. Finally, reconfigurable IPP hardware co-processor 140 is commanded to perform function C on data within memory 145, returning the resultant to memory 145. The block size for performing function C is independent of the block sizes 20 selected for functions A and B.

The usefulness of the block processing is seen from this example. The three functions A, B and C will typically perform amounts of work related to one common data processing size (for example, one 16×16 block of pixels as a final output), that is not necessarily equal in actual input/output sizes due to filter history and up/down sampling among functions. Provision of special hardware for each function will sacrifice the generality of functionality and reusability of reconfigurable hardware. Further, it would be difficult to match the resources granted to each function in hardware to provide a balance and the best utilization of the hardware. When reconfigurable hardware is used there is inevitably an overhead cost for switching between configurations. Operating on a sample by sample basis for flow through the three functions would require a maximum number of such reconfiguration switches. This scenario would clearly be less than optimal. Thus operating each function on a block of Data before reconfiguration to switch between functions would reduce this overhead. Additionally, it would then be relatively easy to allocate resources between the functions by selecting the amount of time devoted to each function. Lastly, such block processing would generally require less control overhead from the digital signal processor core than switching between functions at a sample level.

The block sizes selected for the various functions A, B and C will depend upon the relative data rates required and the data sizes. In addition, the tasks assigned to digital signal processor core 110 and their respective computational requirements must also be considered. Ideally, both digital signal processor core 110 and reconfigurable IPP hardware co-processor 140 would be nearly fully loaded. This would result in optimum use of the resources. The amount of work that should be assigned to the IPP depends on the speedup factor of the IPP co-processor 140 versus the DSP core 110. For example, when the IPP is 4 times faster than the DSP, the optimum workload is to assign 80% of the work to the IPP, and 20% to the DSP to accomplish 5 times the total speedup. Such balanced loading may only be achieved with product algorithms with fixed and known functions and a stable data rate. This should be the case for most imaging and video applications. If the computational load is expected to change with time, then it will probably be best to dynamically allocate computational resources between digital signal processor core 110 and reconfigurable IPP hardware co-processor 140. In this case it is best to keep the functions performed by reconfigurable IPP hardware co-processor 140 relatively stable and only the functions performed by digital signal processor core 110 would vary.

The command set of Reconfigurable IPP hardware co-processor 140 preferably includes several non-computational instructions for control functions.

Receive_data_synchronization (signal, true/false), or wait_until_signal Send_data_synchronization (signal, true/false), or assert_signal Synchronization_completion (signal, true/false), or assert_signal
Call_subroutine(subroutine_addr)
Return()
Reset()
Sleep()
Write_parameter(parameter, value)

These control functions will be useful in cooperation between digital signal processor core 110 and reconfigurable IPP hardware co-processor 140. The first of these commands is a receive_data_synchronization command. This command can also be called a wait_until_signal command. This command will typically be used in conjunction with data transfers handled by direct memory access circuit 120. Digital signal processor core 110 will control the process by setting up the input data transfer through direct memory access circuit 120. Digital signal processor core 110 will send two commands to reconfigurable IPP hardware co-processor 140. The first command is the receive data synchronization command and the second command is the computational command desired.

Reconfigurable IPP hardware co-processor 140 operates on commands stored in the command queue 141 on a first-in-first-out basis. Upon reaching the receive data synchronization command, reconfigurable IPP hardware co-processor will stop. Reconfigurable IPP hardware co-processor will remain idle until it receives the indicated control signal from direct memory access circuit 120 indicating completion of the input data transfer. Note that direct memory access circuit 120 may be able to handle plural queued data transfers. This is known in the art as plural DMA channels. In this case, the receive data synchronization command must specify the hardware signal corresponding to the DMA channel used for input data transfer.

Following the completed receive data synchronization command, reconfigurable IPP hardware co-processor 140 advances to the next command in Command Queue 141. In this case, this next command is a computational command using the data just loaded. Since this computational command cannot start until the previous receive data synchronization command completes, this assures that the correct data has been loaded.

The combination of the receive data synchronization command and the computational command reduces the control burden on digital signal processor core 110. Digital signal processor core 110 need only set up direct memory access circuit 120 to make the input data transfer and send the pair of commands to reconfigurable IPP hardware co-processor 140. This would assure that the input data transfer had completed prior to beginning the computational operation. This greatly reduces the amount of software overhead required by the digital signal processor core 110 to control the function of reconfigurable IPP hardware co-processor 140. Otherwise, digital signal processor core 110 may need to receive an interrupt from direct memory access circuit 120 signaling the completion of the input data load operation. An interrupt service routine must be initiated to service the interrupt. In addition, such an interrupt would require a context switch from the interrupted process to the interrupt service routine, and another context switch to return from the interrupt. Consequently, the receive data synchronization command frees up considerable capacity within digital signal processor core for more productive use.

Another non-computational command is a send data synchronization command. The send data synchronization command is nearly the inverse of the receive data synchronization command, and actually asserts the signal specified. Upon reaching the send data synchronization command, reconfigurable IPP hardware co-processor 140 asserts a signal which then triggers a direct memory access operation. This direct memory access operation reads data from data memory 145 for storage at another system location. This direct memory access operation may be preset by digital signal processor core 110 and is merely begun upon receipt of a signal from reconfigurable IPP hardware co-processor 140 upon encountering the send data synchronization command. In the case in which direct memory access circuit 120 supports plural DMA channels, the send data synchronization command must specify the hardware signal that would trigger the correct DMA channel for the output data transfer. Alternatively, the send data synchronization command may specify the control parameters for direct memory access circuit 120, including the DMA channel if more than one channel is supported. Upon encountering such a send data synchronization command, reconfigurable IPP hardware co-processor 140 communicates directly with direct memory access circuit 120 to set up and start an appropriate direct memory access operation.

Another possible non-computational command is a synchronization completion command, actually another application of assert signal command. Upon encountering a synchronization completion command, reconfigurable IPP hardware co-processor 140 sends a signal to digital signal processor core 110. Upon receiving such a signal, digital signal processor core 110 is assured that all prior commands sent to reconfigurable IPP hardware co-processor 140 have completed. Depending upon the application, it may be better to sense this signal via interrupt or by DSP core 110 polling a hardware status register. It may also be better to queue several operations for reconfigurable IPP hardware co-processor 140 using send and receive data synchronization commands and then interrupt digital signal processor core 110 at the end of the queue. This may be useful for higher level control functions by digital signal processor core 110 following the queued operations by reconfigurable IPP hardware co-processor 140. The IPP also uses the following other control/synchronization commands: Sleep; Reset; Write_parameter. The write_parameter command is used to perform parameter updates. Parameters that are changed frequently can be incorporated into commands to be specified on each task. Parameters, such as output right shift, additional term for rounding, saturation low/high bounds, saturation low/high set values, and operand size(8/16 bit), that are not often changed can be updated using the write_parameter command.

The configurable IPP hardware co-processor supports the following computational commands directly:
Row/column 8-point DCT/IDCT
Vector addition/subtraction/multiplication
Scalar-vector addition/subtraction/multiplication
Table lookup
Sum of absolute differences In addition, through extension and special-casing of the above generic computational commands, the IPP also supports:
2-D DCT/IDCT
demosaicing by simple interpolation
chroma subsampling
wavelets analysis and reconstruction
color suppression
color conversion
memory-to-memory moves Each command will include pointers for relevant data and coefficient storage(input data) as well as addresses for output result data. Additionally, the number of filter taps, up/down sampling factors, the number of outputs produced, and various pointer increment options are attached to the computational commands. Because image processing is the application area, 2-D block processing is allowed whenever feasible.

Figure 4:
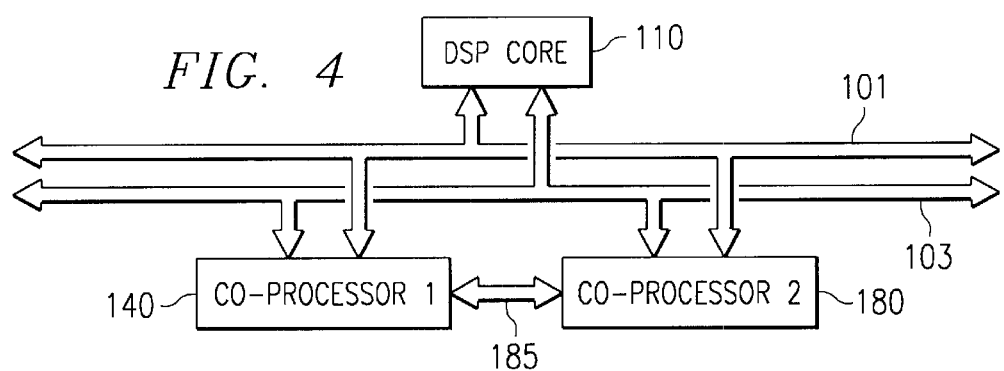

FIG. 4 illustrates another possible arrangement of circuit 100. Circuit 100 illustrated in FIG. 4 includes 2 reconfigurable IPP hardware co-processors, 140 and 180. Digital signal processor core operates with first reconfigurable IPP hardware co-processor 140 and second reconfigurable IPP hardware co-processor 180. A private bus 185 couples first reconfigurable IPP hardware co-processor 140 to reconfigurable IPP hardware co-processor 180. These co-processors have private memories sharing the memory space of digital signal processor core 110. The data can be transferred via private bus 185 by one co-processor writing to the address range encompassed by the other co-processor's memory. Alternatively, each co-processor may have an output port directed toward an input port of another co-processor with the links between co-processors encompassed in private bus 185. This construction may be particularly useful for products in which data flows from one type operation handled by one co-processor to another type of operation handled by the second co-processor. This private bus frees digital signal processor 110 from having to handle the data handoff either directly or via direct memory access circuit 120.

Figure 5:
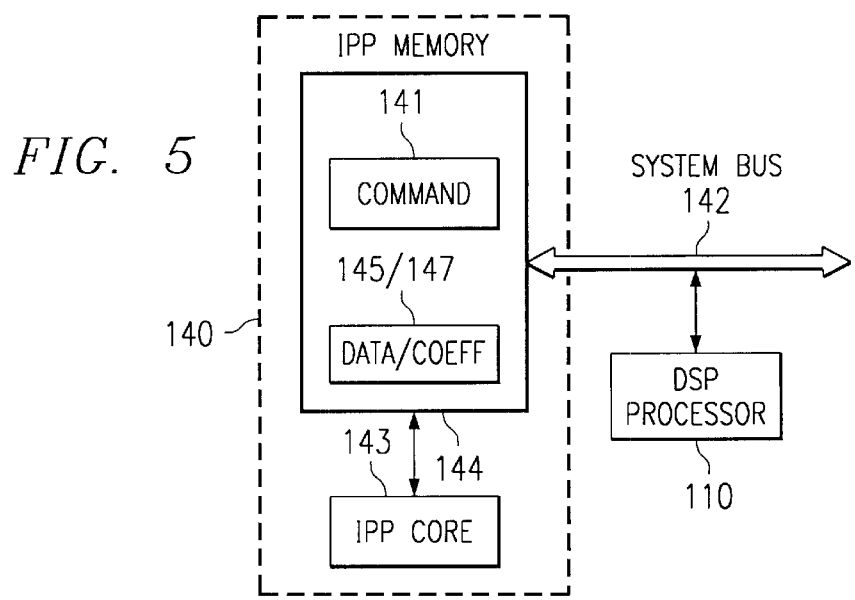
FIG. 5 illustrates an alternate connection between DSP and the IPP coprocessor, where the coprocessor and its memory blocks form a subsystem which is loosely connected to DSP on a system bus.

Alternatively, FIG. 5 illustrates digital signal processor core 110 and a reconfigurable IPP hardware co-processor 140 loosely connected together via system bus 142. Digital signal processor core 110 may be of conventional design. In the preferred embodiment, reconfigurable IPP hardware co-processor 140 is adapted to coordinate with direct memory access circuit 120 for autonomous data transfers independent of digital signal processor core 110. The parts illustrated in FIG. 5 are not intended to exclude the provision of other conventional parts. The system level connection in FIG. 5 may be useful when the digital signal processor core 140 in a particular implementation does not offer connection to its internal bus, for example when using catalog devices. Data transfer overhead is usually larger when IPP coprocessor 140 is attached to the system bus, yet there is more system level flexibility, like using multiple DSPs or multiple IPPs in the same system, and relative ease of changing or upgrading DSP and IPP.

As an example of the communication between and the DSP and the IPP, if the DSP is instructing the IPP to perform a vector addition task, these are the events that occur from the DSP's point of view. The DSP sets up the DMA transfer to send data to the IPP. Then the DSP sends a wait_until_ signal command to the IPP(this signal will be asserted by the DMA controller once the transfer is completed). Next the DSP sends a vector_add command to the IPP, which frees up the DSP to perform other tasks. Now, either the DSP comes back to check on the completion status of the IPP, or alternatively, the DSP can be interrupted upon completion of the IPP task upon receipt of a assert_signal command, which would follow the vector_add command. Finally, the DSP sets up the DMA to get the result back from the IPP. As mentioned previously, as there is some overhead in managing each data transfer and each computation command, the functionality of the IPP supports and encourages block computations. Another advisable practice is to perform cascaded tasks on the IPP for the same batches of data, to reduce data transfers, and thus reduce the DSP load as well as the system bus load and overall power consumption.

The IPP supports one-dimensional, row-wise filtering when data is stored in rows. Certain combinations of upsampling and downsampling are supported as well. For example, the following 5 methods implement various up/down sampling options and constraints on filter length. Only configurations A and D (FIGS. 8 and 12) are considered here; there are many more methods in a fully reconfigurable IPP datapath (FIG. 13).

write-back for writing can reduce the access time. Around 512 bits in this buffer, half for read and half for write, should be sufficient.

Three logical memory blocks, data memory A and B and command memory, are accessible from a system bus via an external bus interface. The memory interface handles memory arbitration between the IPP 140 and the system bus 142, as well as simple First-In First-Out (FIFO) control involved in matching the system bus access width with the memory width. Data A and B are for input/output data and coefficients. Cascaded commands can reuse areas in the data memory, so the terms input/output are in the context of a single command. As previously mentioned, the Command Queue 141 can receive commands from the digital signal processor 110 via the digital signal processor bus 142, and in supplying those commands to the Execution Control unit 190, control the operation of the reconfigurable IPP hardware coprocessor 140. The control block steps through the desired memory access and computation functions indicated by the command. Command memory 141 is read by the decode unit 142. To conserve memory, variable length commands are incorporated. The decode unit 142 sends the produced control parameters (one set per command) to the execution control unit 190, which use the control parameters to drive a pipelines control path to fan out the control signals to the appropriate components. Control signals can be either

| Method | a) no up/down sampling | b) u/s up sample in space-time | c) up sample in space | d) - down sample in space | e) up sample in space-time |
|---|---|---|---|---|---|
| Configuration | A (8 MACs) | A (8 MACs) | A (8 MACs) | D (quad 2-trees) | D (quad 2-trees) |
| Filter taps (Util = 1) | Any | any | any | Even | even |
| Upsampling factor | 1 | 8, 16, 24 | 2, 4, 8 | 1 | 4, 8, 12 |
| Downsampl factor | 1 | Any | 1 | 2 | Any |

Figure 6:
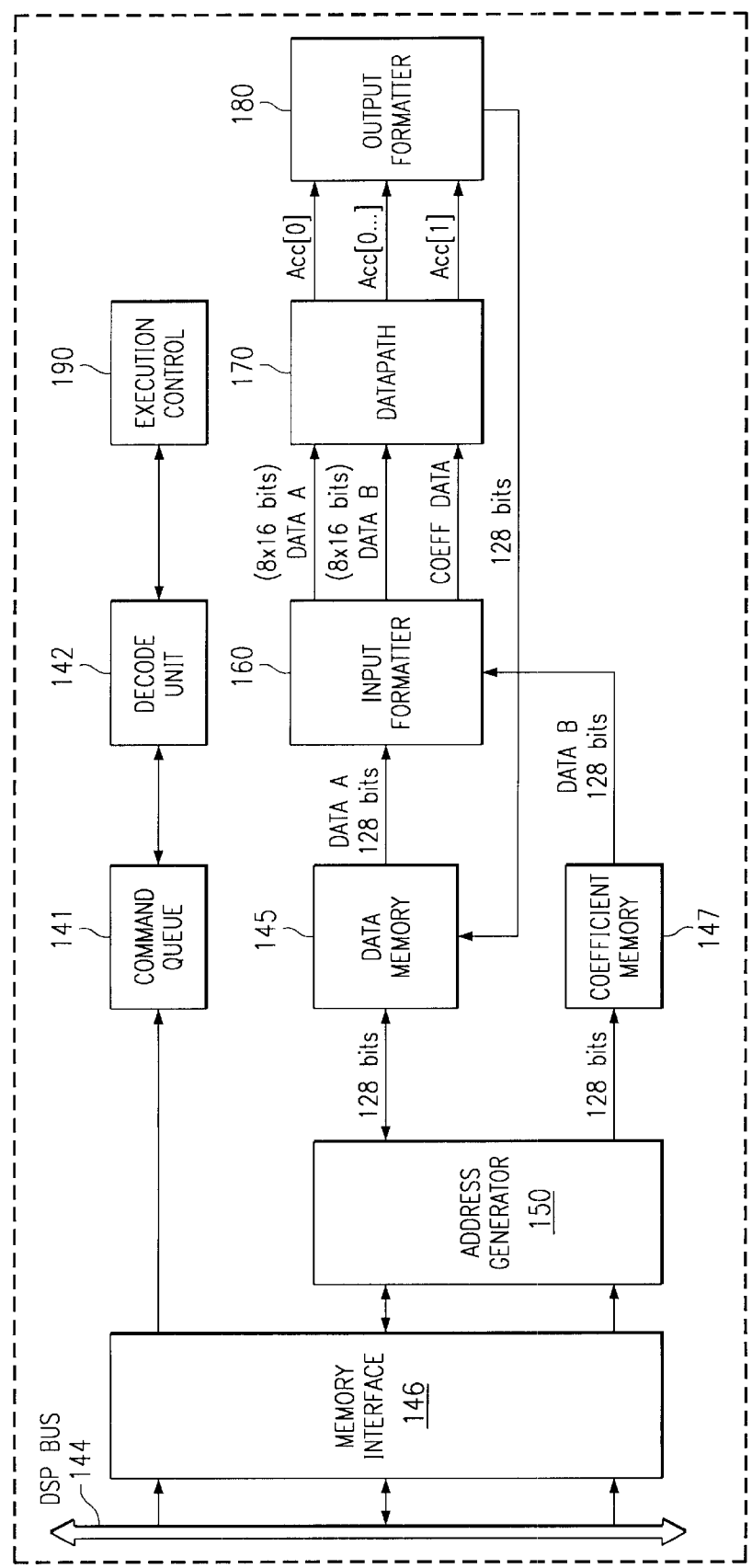
FIG. 6 illustrates the IPP overall block diagram architecture according to a preferred embodiment of the invention.

FIGS. 6–15 illustrate the construction of an exemplary reconfigurable IPP hardware co-processor with FIGS. 8 and 10–15 illustrating various Datapath configurations. FIG. 6 illustrates the overall block diagram general architecture of reconfigurable IPP hardware coprocessor 140 according to a preferred embodiment of the invention. On the host's memory map, the IPP interface should appear as large contiguous memory blocks, for coefficients, data and macrocommands, and also as discrete control/status registers, for configuration, command queue, run-time control, etc. The configuration/command queue registers may very well sit on the host's DSP external bus in either I/O or memory address space. Multiple write addresses (with respect to the host) must be set up to modify less frequently changed parameters in IPP such as hardware handshake signaling, software reset, and so on. One write address for commands, links to an internal command queue. There are a few additional write addresses for clearing interrupts, one for each interrupt. There is at least one read address for query of command completion status.

The data portion should map into the host's memory space, if possible. If the address space is insufficient, address and data ports should be separate, such that writing to the address port sets up an initial address, and subsequent read/writes to the data port transfer contiguous data from/to the IPP data memory. In terms of IPP implementation, buffering is necessary between the outside 16/32 bit bus and the internal memory's 128 bit width. A small cache can be used for that purpose. Read ahead technique for reading and fixed or time-varying in a command. They include memory access requests, input/output formatter control, and datapath control.

Data memory 145 and coefficient memory 147 are wide memory blocks (128-bit each) to support an 8-way parallel 16-bit datapath. This 128 bit wide memory block precludes the data path from having to access memory every cycle. The Data Memory 145 receives relevant input data via DSP bus 144 and also stores the Resultant Data subsequent processing through the Datapath core 170 and reformatting in the Output Formatter 180. Coefficient data can also be received from the DSP bus 144, or possibly, provided in a Look-Up Table within the IPP itself, and along with the input data, be processed through the Datapath core 170 and then reformatted in the Output formatter block 180. Data memory 145 and coefficient memory 147 may be written to in 128 bit words. This write operation is controlled by digital signal processor core 110 or direct memory access circuit 120 which, through the use of operand pointers in the commands, manage the two memory blocks. Address generator 150 generates the addresses for recall of Data and Coefficients used by the co-processor. This read operation operates on data words of 128 bits from each memory.

The recalled 128 bit data words from Data and Coefficient Memories are supplied to input formatter 160. Input formatter 160 performs various shift and alignment operations generally to arrange the 128 bit input data words into the order needed for the desired computation. Input formatter outputs a 128 bit (8 by 16 bits) Data A, a 128 bit (8 by 16 bits) Data B and a 128 bit (8 by 16 bits) Coeff Data.

Figure 12:
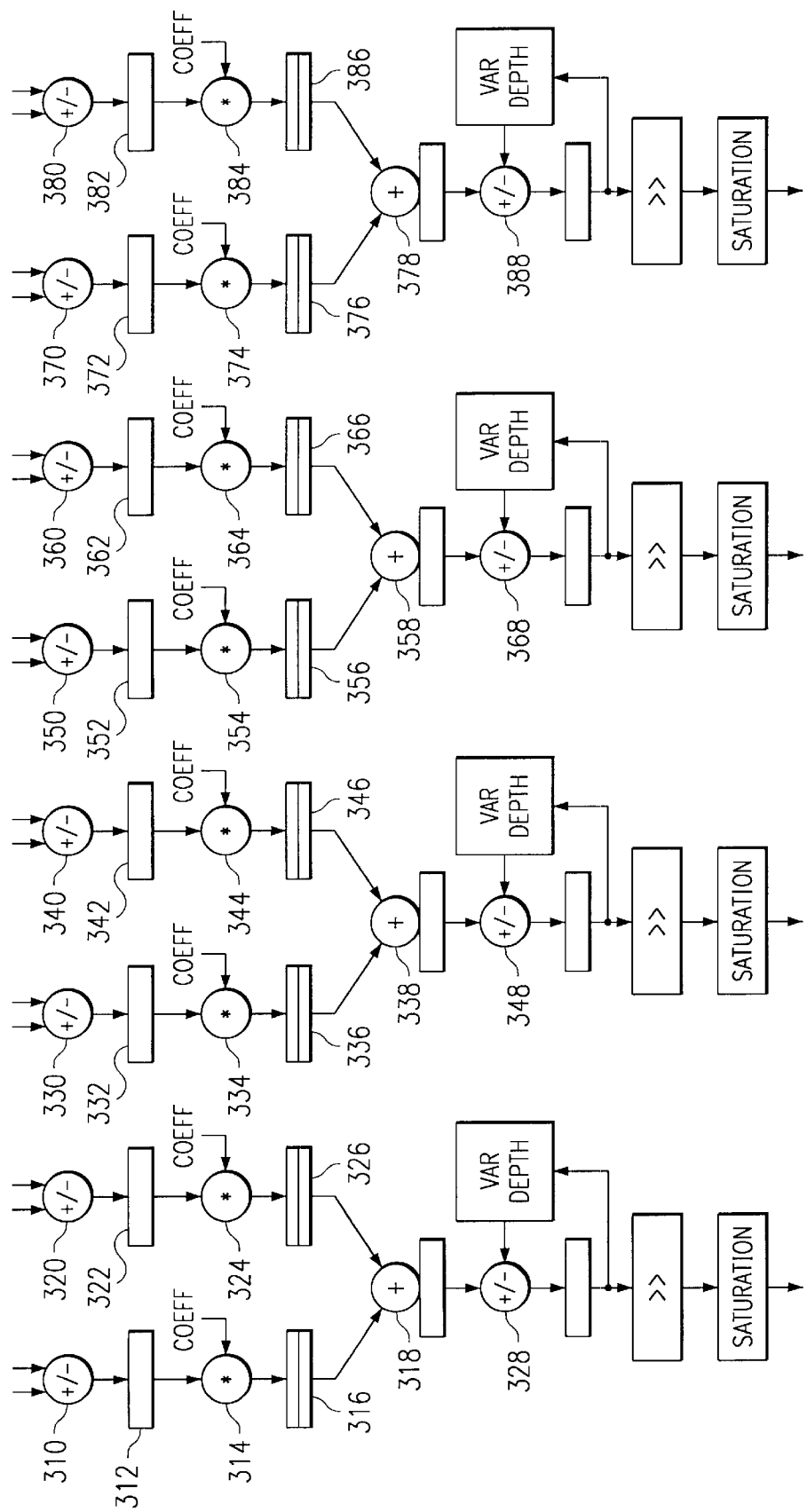
FIG. 12 illustrates a diagram of the IPP datapath architecture D of another alternative adder configuration of the adder portion of the IPP, quad-2 tress, according to a preferred embodiment.

These three data streams, Data A, Data B, and Coeff Data, are supplied to Datapath 170. Datapath 170 is the operational portion of the co-processor. The datapath can be configured in the run-time to support a variety of image processing tasks. FIGS. 12 and 13 illustrate two preferred embodiments of the invention. Some tasks can be mapped into both configurations, each providing a different pattern of input/output memory access. These choices offer flexibility in the hand of application programmers to balance speed, data memory and sometimes power requirements. As will be further described below, datapath 170 includes plural hardware multipliers and adders that are connectable in various ways to perform a variety of multiply-accumulate operations. Datapath 170 outputs three adder data streams. Two of these three are 16 bit data words while one of the three is a 128 bit word(8 by 16 bits).

These three data streams supply the inputs to output formatter 180. Output formatter 180 rearranges the three data streams into eight 128 bit data words for writing back into the memory. The addresses for these two write operations are computed by address generator 150. This rearrangement may take care of alignment on memory word boundaries.

The operations of co-processor are under control of control unit 190. Control unit 190 recalls the commands from command queue 141 and provides the corresponding control within co-processor 140.

Figure 7:
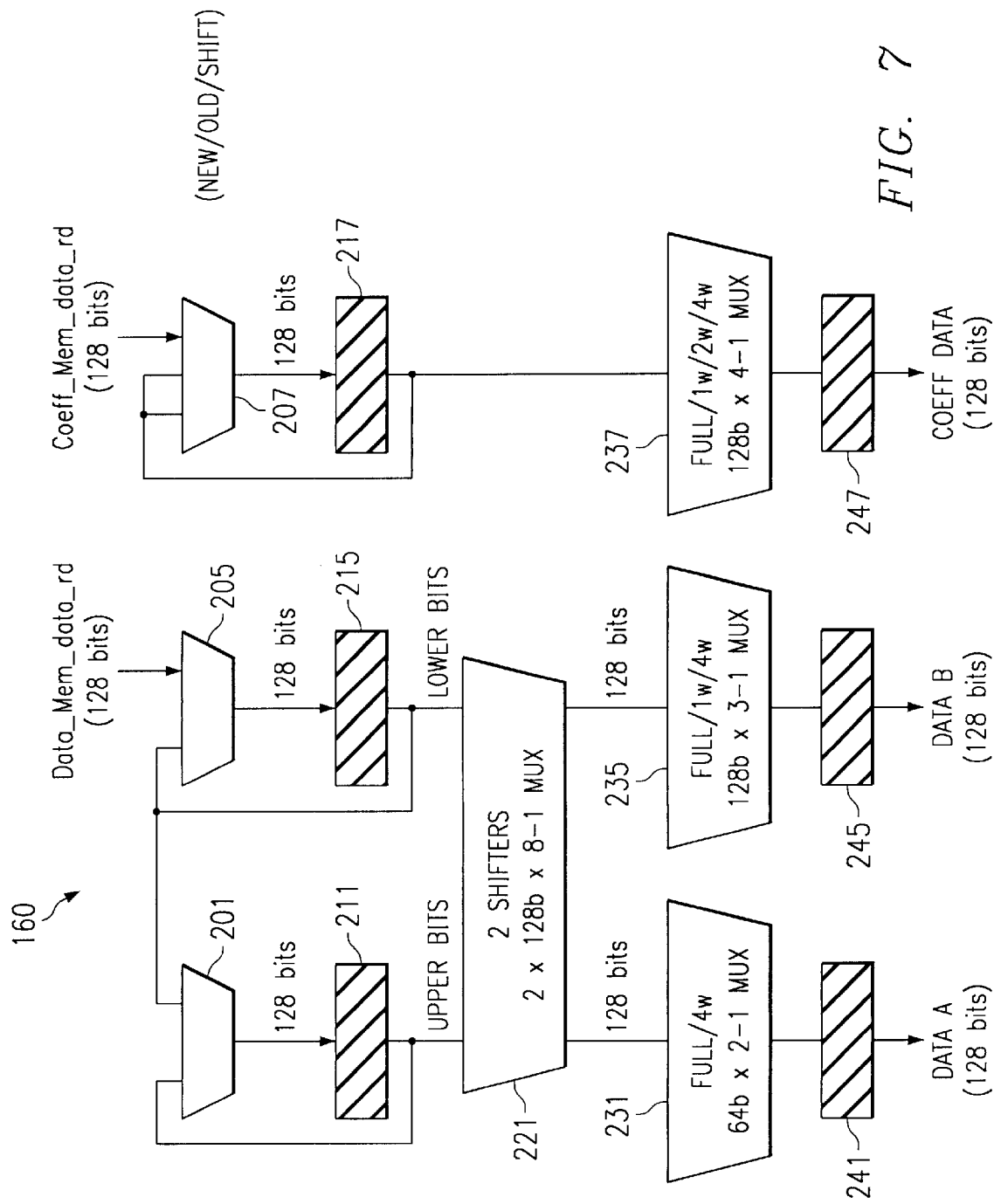
FIG. 7 illustrates the input formatter of the reconfigurable IPP hardware co-processor illustrated in FIG. 6.

The construction of input formatter 160 is illustrated in FIG. 7. The two data streams Data A and Data B of 128 bits each are supplied to an input of multiplexers 205 and 207. Each multiplexer independently selects one input for storage in it's corresponding register, 215 and 217 respectively. Multiplexer 205 may select either one of the input data streams or to recycle the contents of register 215. Multiplexer 201 may select either the contents of register 215 or to recycle the contents of it's register 211. Multiplexer 207 may select either the other of the input data streams, or to recycle the contents of register 217. The lower bits of shifter 221 are supplied from register 215. The upper bits of shifter 221 are supplied by register 211. Shifter 221 shifts and selects all 256 of it's input bits and 128 bits are supplied to one full/4 way 64b×2-1 multiplexer 231 and 128 bits are supplied to full/1way/4way 128b×3-1 multiplexer 235. The 128 bit output of multiplexer 231 is stored temporarily in register 241 and forms the Data A input to datapath 170. The 128 bit output of multiplexer 235 is stored temporarily in register 245 and forms the Data B input to datapath 170. The output of multiplexer 207 is supplied directly to a full/1w/2w/4w 128b×4-1 multiplexer 237 as well as supplied to register 217. Multiplexer 237 selects the entire 128 bits supplied from register 217 and stores the result in register 247. This result forms the coefficient data input to datapath 170.

Figure 8:
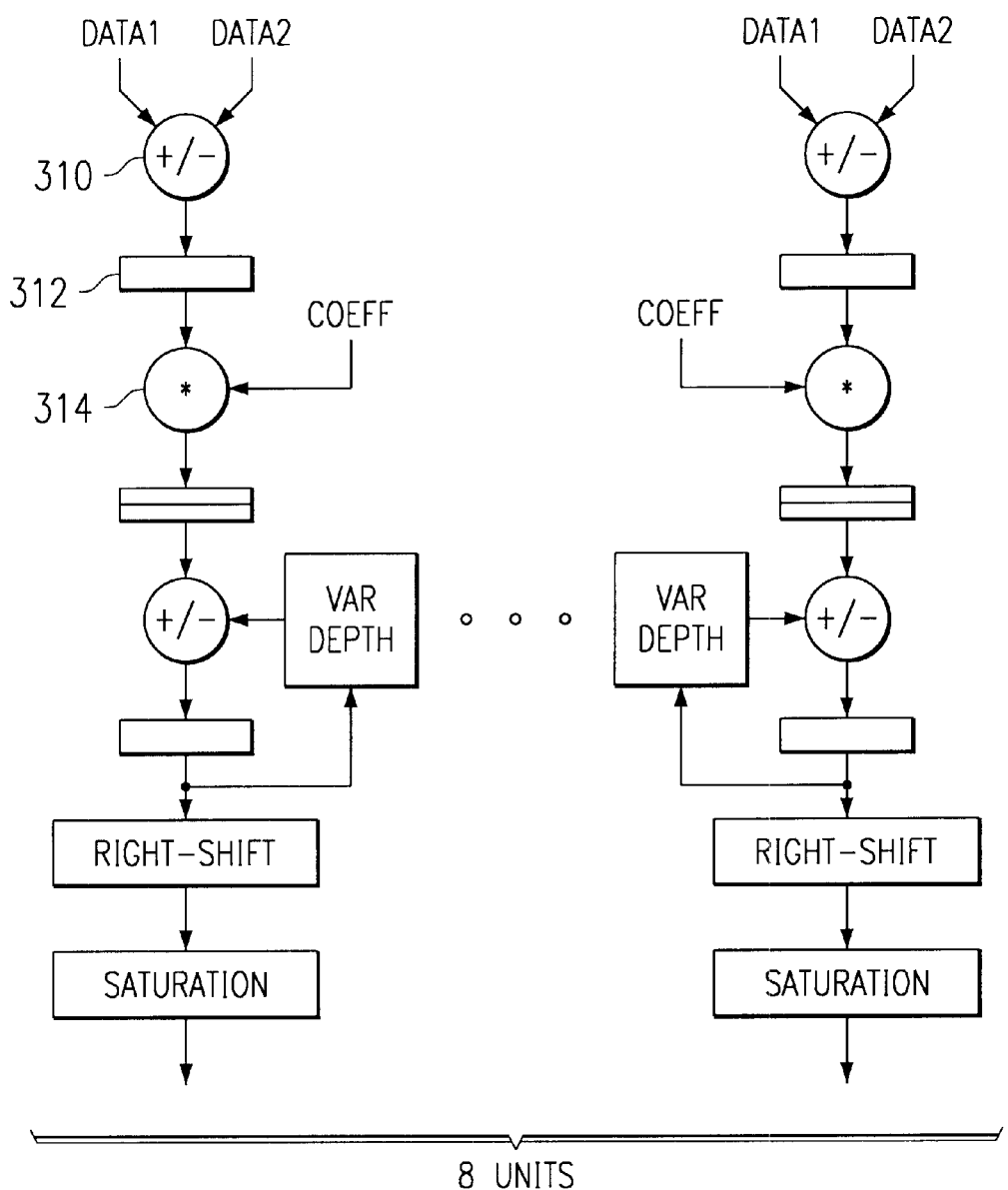
FIG. 8 illustrates a schematic diagram of the IPP Datapath Architecture A, with 8 independent MACs.

As mentioned previously, the three data streams, Data A, Data B, and Coeff Data, are supplied to Datapath 170 for processing. FIG. 8 illustrates a Datapath architecture according to a first preferred embodiment of the invention, in which eight Multiply Accumulate Units (MACs) are connected in parallel("A" configuration). The multiply-accumulate operation, where the sum of plural products is formed, is widely used in signal processing, for example, in many filter algorithms. N multiply accumulate(where N=8 in this example) units are operated in parallel to compute N output points. This configuration is suitable for a wide-memory word that contains multiple pixels, typical for image processing. The feedback loop on the final row of adders contain multiple banks of accumulators to support upsampling. According to a preferred embodiment, each MAC is associated with 3 accumulators, and Control Unit 190 includes the necessary addressing mechanism for these accumulators. An accumulator depth of three is chosen in order to support color conversion, which involves 3×3 matrixing. Thus, an accumulator depth of three simplifies implementation for color conversion.

Figure 9:
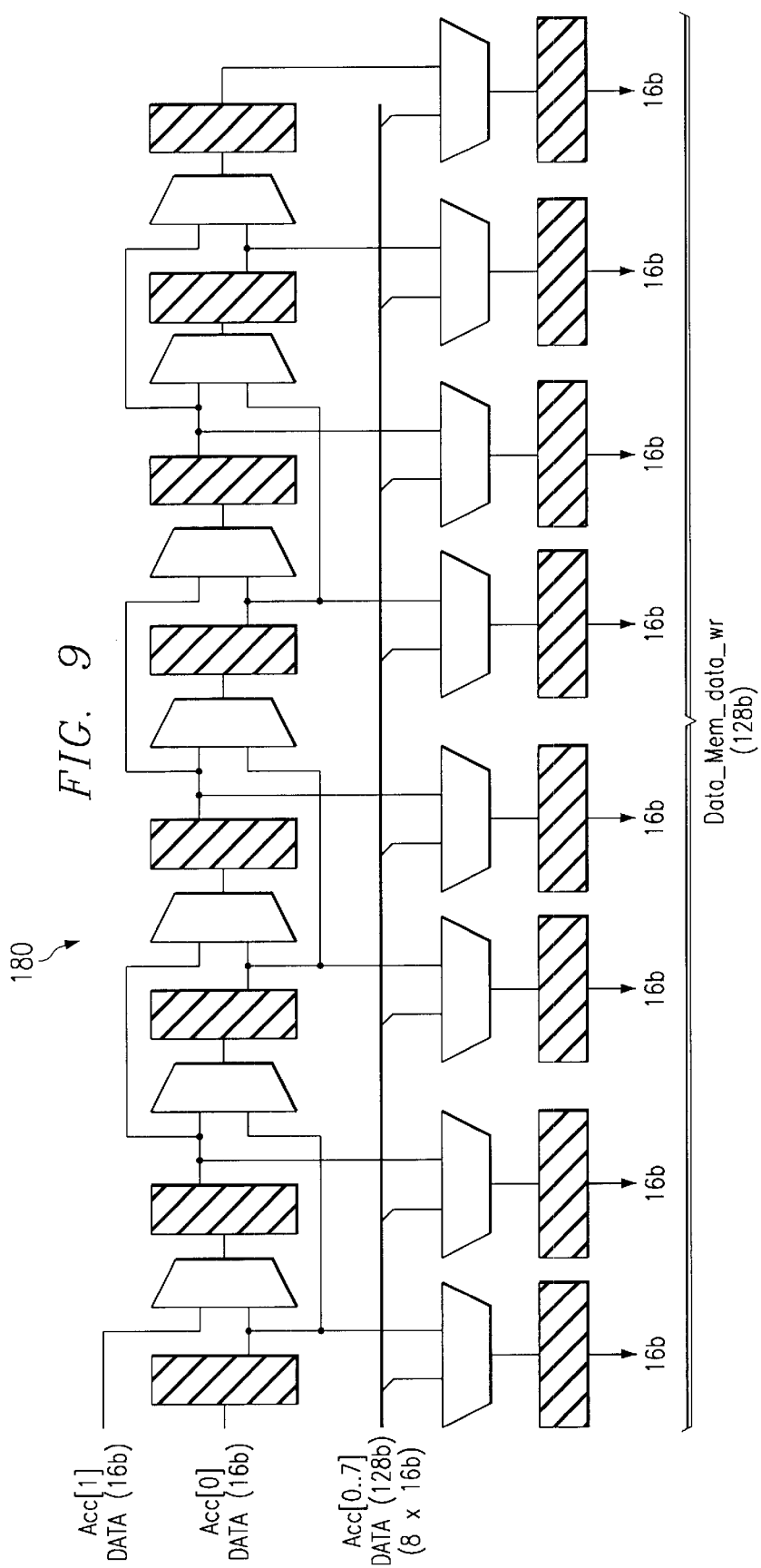
FIG. 9 illustrates the output formatter of the reconfigurable IPP hardware co-processor illustrated in FIG. 6.

FIG. 9 illustrates the construction of the output formatter 180 illustrated in FIG. 6. The 16 bit dataword outputs of the first and second accumulators within reconfigurable IPP hardware co-processor 140 (Acc[0] and Acc[1]) form the first two inputs to the output formatter 180, with the outputs of all 8 accumulators of reconfigurable IPP hardware co-processor 140 (Acc[0], Acc[1], Acc[2], Acc[3], Acc[4], Acc[5], Acc[6], Acc[7]) providing the third input to the output formatter. Eight, 16 bit blocks are written to data memory 145 subsequent processing through the multiplexers and registers of output formatter 180.

Figure 10:
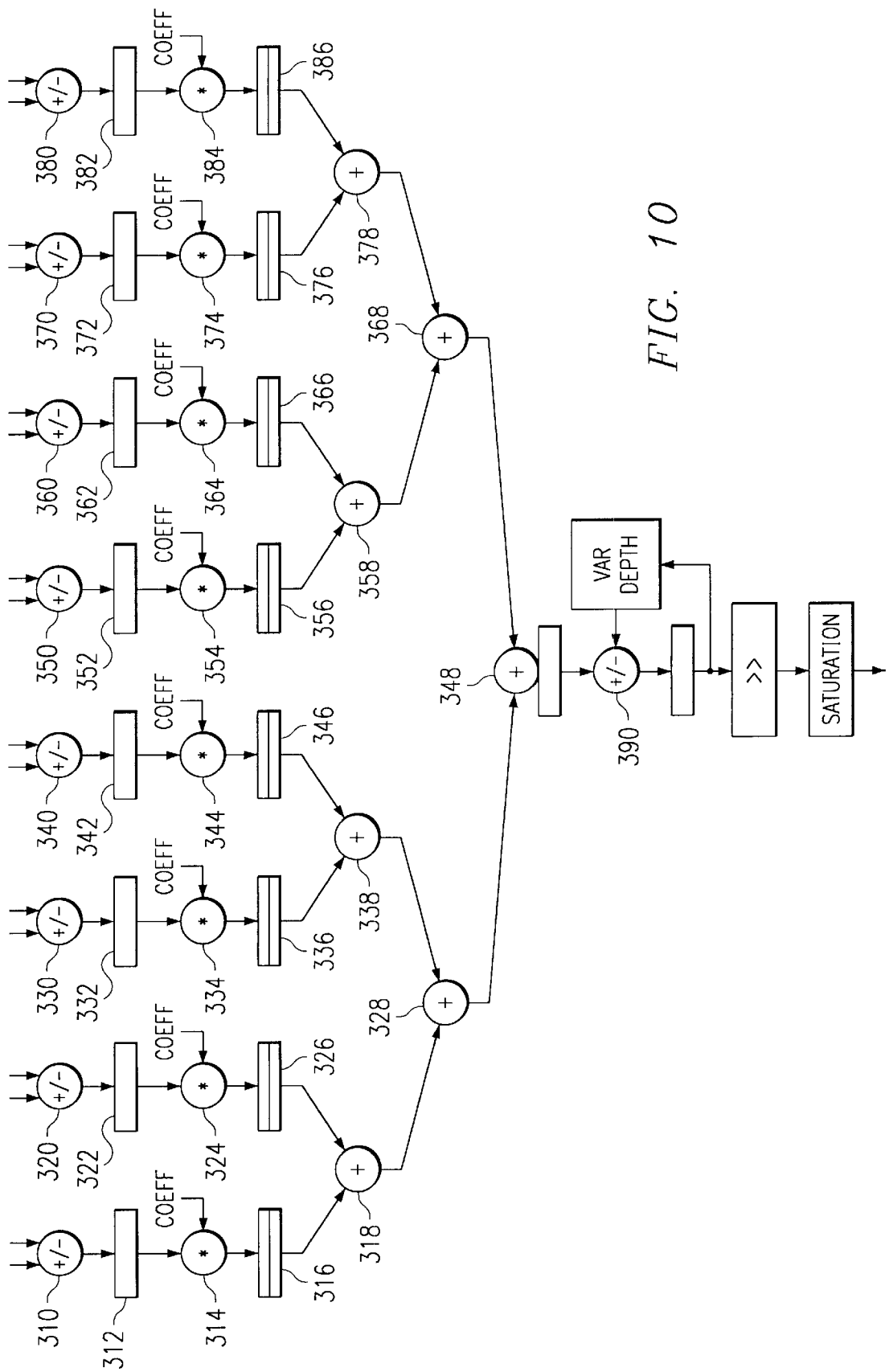
FIG. 10 illustrates a diagram of the IPP datapath architecture B of one alternative adder configuration of the adder portion of the IPP, the single 8-tree adder, according to a preferred embodiment.

FIG. 10 illustrates the construction of datapath 170 according to a second preferred embodiment illustrating a single 8-tree adder configuration("B'" configuration). Various segments of the Data A and Data B 128 bit(8×16 bit) dataword inputs to the datapath 170, supplied from input formatter 160, are supplied to adders/subtractors (adders), 310, 320, 330, 340, 350, 360, 370 and 380. As shown, the first 16 bit datawords, Data A[0] and Data B[0], which represent the left most or most significant bits of the 128 bit output, are coupled to adder 310, and adder 320, the second 16 bit datawords Data A[,] and Data B[1] are coupled to adder 330 and adder 340, the third 16 bit datawords, Data A[2] and Data B[2] are coupled to adder 350 and adder 360, the fourth 16 bit datawords, Data A[3] and Data B[3] are coupled to adder 370 and adder 380. The result of this addition or subtraction of the first 16 bit datawords through fourth datawords is stored in pipeline registers 312, 322, 332, 342, 352, 362, 372 and 382. This result is then multiplied by the Coeff Data, which for this configuration of IPP, consists of the same two 16 bit datawords. In other words, with the 8 MAC configuration shown in FIG. 10, 4 data words and two coefficient words are fed to the hardware, on each cycle. These same two coefficient words are used in every pair of adders to multiply the input data point with, and the products, which are stored in pipeline registers 316, 326, 336, 346, 356, 366, 376 and 386, are summed in adders 318, 338, 358 and 378. The results of those summations are summed in adders 328 and 368, the summations of which are added in adder 348. The output of adder 348 is accumulated in accumulator 349. The benefit of this configuration is the requirement of only, albeit 8 multipliers, one accumulator to process the two 128 bit word outputs of input formatter 160.

Figure 11:
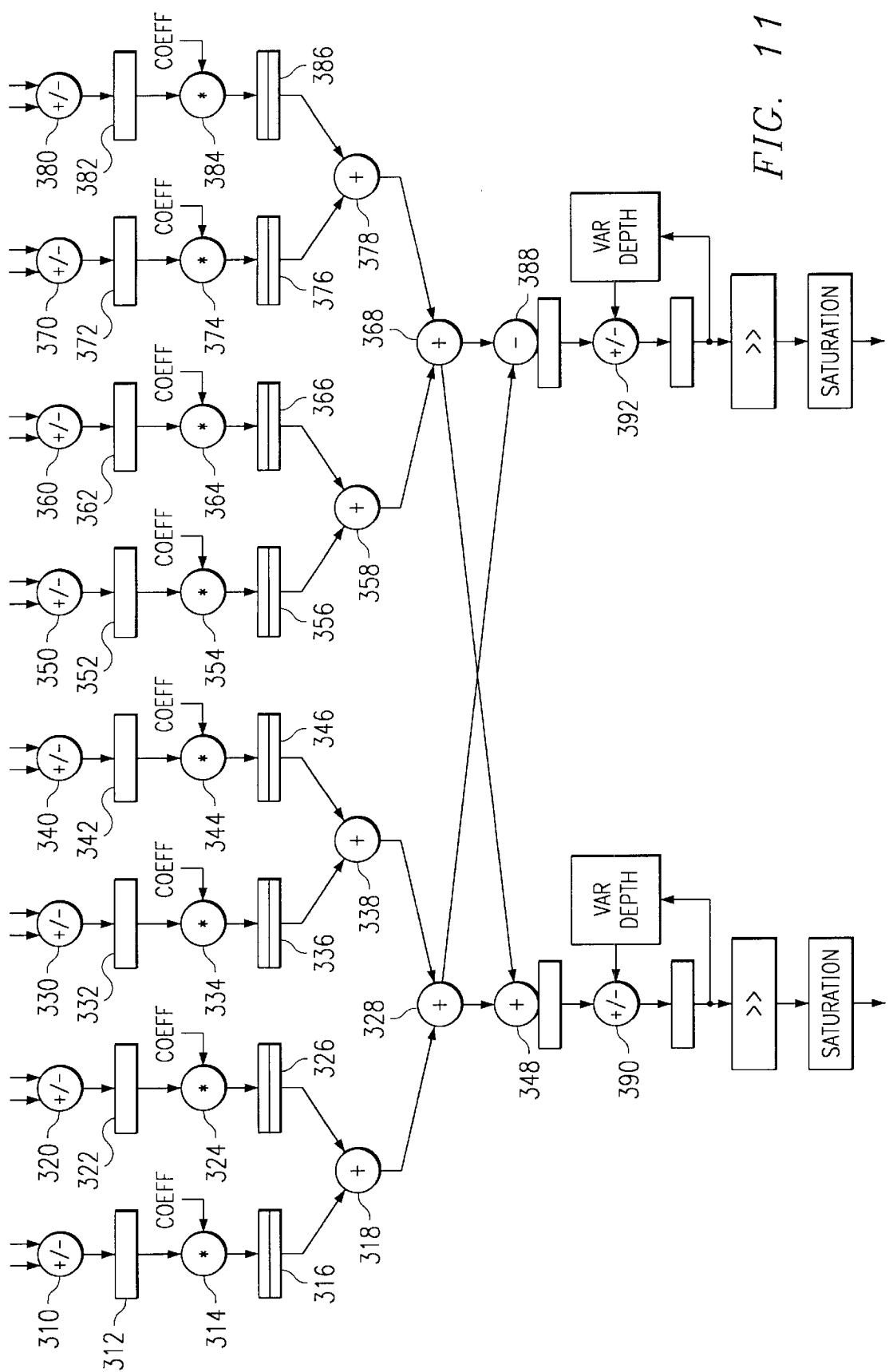
FIG. 11 illustrates a diagram of the IPP datapath architecture C of another alternative adder configurations of the adder portion of the IPP, dual 4-trees with butterfly, according to a preferred embodiment.

FIG. 11 illustrates the construction of datapath 170 according to a third preferred embodiment illustrating a dual 4-tree with butterfly adder configuration("C configuration"). Various segments of the Data A and Data B 128 bit(8×16 bit) dataword inputs to the datapath 170, supplied from input formatter 160, are supplied to adders/subtractors (adders), 310, 320, 330, 340, 350, 360, 370 and 380. As shown, the first 16 bit datawords, Data A[0] and Data B[0], which represent the left most or most significant bits of the 128 bit output, are coupled to adder 310, the second 16 bit datawords Data A[1] and Data B[1] are coupled to adder 320, the third 16 bit datawords, Data A[2] and Data B[2] are coupled to adder 330, the fourth 16 bit datawords, Data A[3] and Data B[3] are coupled to adder 340, the fifth 16 bit datawords, Data A[4] and Data B[4] are coupled to adder 350, the sixth 16 bit datawords Data A[5] and DataB[5] are coupled to adder 360, the seventh 16 bit datawords Data A[6] and Data B[6] are coupled to adder 370 and the eighth 16 bit datawords, or the least significant bits of the 128 bit output of input formatter 160, Data A[7] and Data B[7] are coupled to adder 380. The result of this addition or subtraction of first 16 bit datawords through eighth datawords is stored in pipeline registers 312, 322, 332, 342, 352, 362, 372 and 382. This result is then multiplied by the Coeff Data, which for this configuration of IPP, consists of two 16 bit words. In other words, with the 2 MAC configuration shown in FIG. 11, 8 datawords and two coefficient words are fed to the hardware, on each cycle. These same two coefficient words are used in every adder/multiplier portion of each MAC unit to multiply the input data point with, and the products, which are stored in pipeline registers 316, 326, 336, 346, 356, 366, 376 and 386, are summed in adders 318, 338, 358 and 378. The results of those summations are summed in adders 328 and 368. The summation from adder 328 is then subtracted from the summation from adder 368 in subtractor 388. The output from 388 is then accumulated in accumulator 359. The summation from adder 368 is then added to the summation from adder 328 in adder 348. The output of adder 348 is then accumulated in accumulator 349. The output of adder 348 is accumulated in accumulator 349. The benefit of this configuration is the requirement of only, albeit 8 multipliers, two accumulators to process the two 128 bit word outputs of input formatter 160.

FIG. 12 illustrates the construction of datapath 170 according to a fourth preferred embodiment wherein a quad 2-tree adder configuration is illustrated("D configuration"). Various segments of the Data A and Data B 128 bit(8×16 bit) dataword inputs to the datapath 170, supplied from input formatter 160, are supplied to adders/subtractors (adders), 310, 320, 330, 340, 350, 360, 370 and 380. Two different input data schemes are envisioned. The first scheme provides 8 datawords and 2 coefficient words to the hardware each cycle. Downsampling of 2x is performed with the filtering. Each pair of MAC units performs two multiplications and accumulates the sum of the products. The second scheme provides 2 datawords and 8 coefficient words to the hardware each cycle. Again, each pair of MAC units performs two multiplications, an addition and an accumulation. Upsampling is performed with the 4-way parallelism and optionally with the depth of each accumulator.

According to the first scheme, the first 16 bit datawords, Data A[0] and Data B[0], which represent the left most or most significant bits of the 128 bit output, are coupled to adder 310, the second 16 bit datawords Data A[1] and Data B[1] are coupled to adder 320, the third 16 bit datawords, Data A[2] and Data B[2] are coupled to adder 330, the fourth 16 bit datawords, Data A[3] and Data B[3] are coupled to adder 340, the fifth 16 bit datawords, Data A[4] and Data B[4] are coupled to adder 350, the sixth 16 bit datawords Data A[5] and DataB[5] are coupled to adder 360, the seventh 16 bit datawords Data A[6] and Data B[6] are coupled to adder 370 and the eighth 16 bit datawords Data A[7] and Data B[7] are coupled to adder 380. The result of this addition or subtraction of first bit datawords through eighth datawords is stored in pipeline registers 312, 322, 332, 342, 352, 362, 372 and 382. This result is then multiplied by the Coeff Data, which for this configuration of IPP, consists of two 16 bit coefficient words. In other words, with the quad 2-tree adder configuration shown in FIG. 12, 8 datawords and two coefficient words are fed to the hardware, on each cycle. The same two coefficient words are used in every pair of MAC units to multiply the input data point with, and the products, which are stored in pipeline registers 316, 326, 336, 346, 356, 366, 376 and 386, are summed in adders 318, 338, 358 and 378. The summation from adders 318, 338, 358 and 378 are then accumulated in accumulators 319, 339, 359 and 379. The benefit of this configuration is the requirement of only, albeit 8 multipliers, four accumulators to process the two 128 bit word outputs of input formatter 160.

Figure 13A:
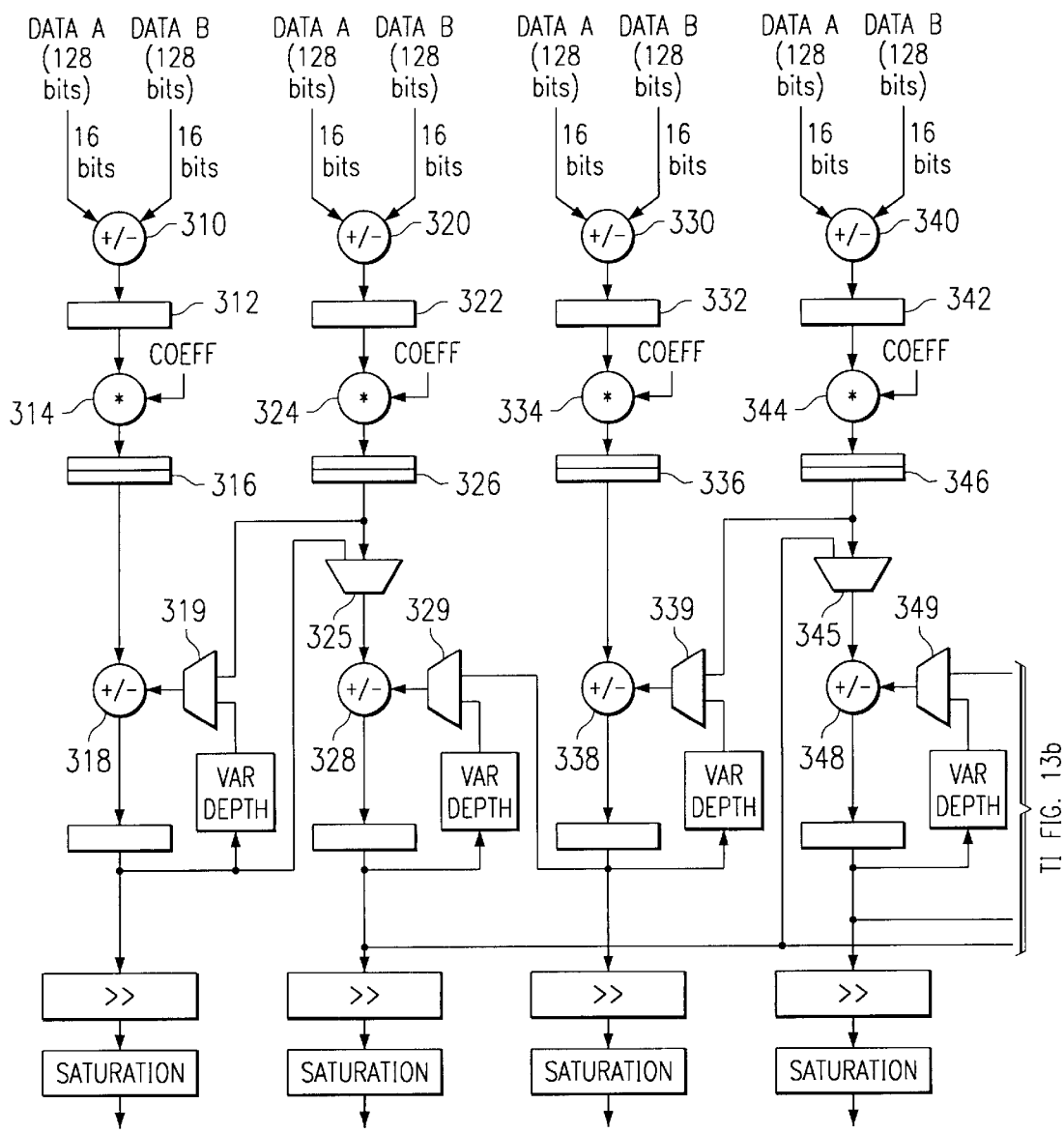
FIGS. 13a and 13b together illustrate a diagram of the IPP reconfigurable datapath architecture that includes routing and multiplexing necessary to support the A/B/C/D configurations shown in FIGS. 8, 10, 11, and 12.
Figure 13B:
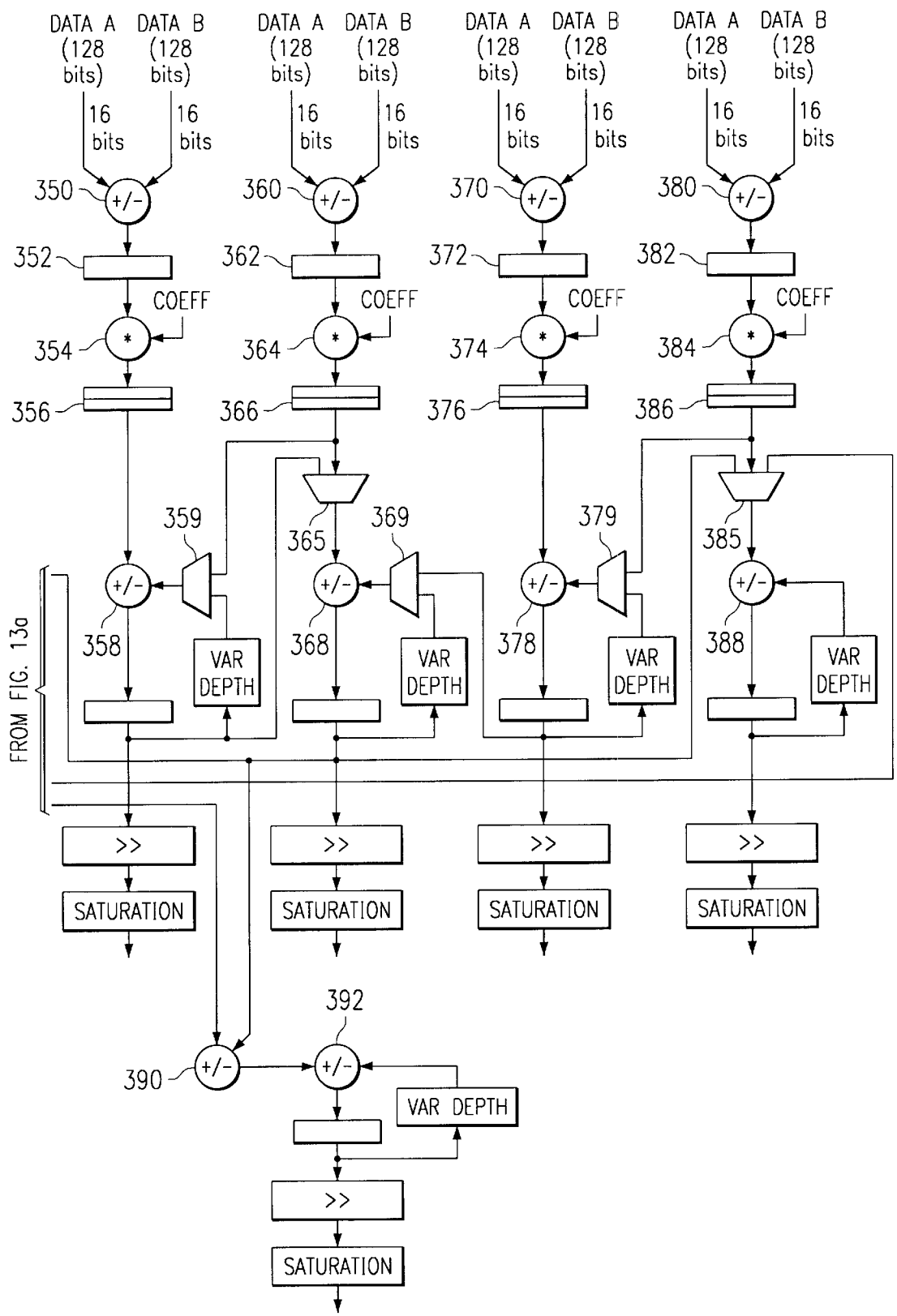

FIGS. 13a and 13b together illustrate the construction of datapath 170 that includes routing and multiplexing necessary to support the 4 configurations, A, B, C, and D (FIGS. 8, 10, 11, and 12). Various segments of the Data A and Data B 128 bit(8×16 bit) dataword inputs to the datapath 170, supplied from input formatter 160, are supplied to adders/subtractors (adders), 310, 320, 330, 340, 350, 360, 370 and 380. As shown, the first 16 bit datawords, Data A[0] and Data B[0], which represent the left most or most significant bits of the 128 bit output, are coupled to adder 310, the second 16 bit datawords Data A[1] and Data B[1] are coupled to adder 320, the third 16 bit datawords, Data A[2] and Data B[2] are coupled to adder 330, the fourth 16 bit datawords, Data A[3] and Data B[3] are coupled to adder 340, the fifth 16 bit datawords, Data A[4] and Data B[4] are coupled to adder 350, the sixth 16 bit datawords Data A[5] and DataB[5] are coupled to adder 360, the seventh 16 bit datawords Data A[6] and Data B[6] are coupled to adder 370 and the eighth 16 bit datawords Data A[7] and Data B[7] are coupled to adder 380. The result of this addition or subtraction of first bit datawords through eighth datawords is stored in pipeline registers 312, 322, 332, 342, 352, 362, 372 and 382. This result is then multiplied by the Coeff Data, which for this configuration of IPP, consists of the same 16 bit dataword. In other words, with the 8 MAC configuration shown in FIGS. 8 and 13, 8 datawords and one coefficient dataword is fed to the hardware, on each cycle. This same coefficient dataword is used in every MAC unit to multiply the input data point with, and the products, which are stored in pipeline registers 316, 326, 336, 346, 356, 366, 376 and 386, are accumulated in adders 318, 328, 338, 348, 358, 368, 378 and 388.

Actually, as shown in the routing and multiplexing for configurations A/B/C/D diagram of FIG. 13, the products form one input to adders, 318 through 388. The second input to adder 318 is formed by the output of multiplexer 319, which has two inputs; the first being the product from the multiplier 324 and the second being the accumulated sum of adder 318. Adder 328 has multiplexers 325 and 329 on both inputs. Multiplexer 325 selects between multiplier 324 or the output of adder 318. Multiplexer 329 selects between accumulated result from adder 328 itself, or from the next adder 338. In the 8 MACs configuration (A, FIG. 8), the pair of adders 318 and 328 implement separate accumulation of products from multipliers 314 and 324. In the quad 2-trees configuration (E, FIG. 12), the pair of adders 318 and 328 implement summation of the products (by 318) then accumulating the sums (by 328).

Similarly, the adder pair 338 and 348, the adder pair 358 and 368, and the adder pair 378 and 388 each implement either separate accumulation of products or accumulation of sums of 2 products. In case of the summed-up accumulation supporting quad 2-trees configuration, adders 348, 368, and 368 produces the final accumulated outputs, just like adder 328.

To support the dual 4-tree with butterfly configuration (C), multiplexers 319, 339, 359, and 379 are selected such that adders 318, 338, 358, and 378 sums up neighboring pairs of products from the 8 multipliers. Multiplexers 325 and 329 are selected such that adder 328 adds up results of adders 318 and 338, and thus has the sum from the first 4 multipliers 314, 324, 334, and 344. Multiplexers 365 and 369 are similarly selected so that adder 368 has the sum from the last 4 multipliers 354, 364, 374 and 384. These 2 sums, at adders 328 and 368, are then routed to both adders 348 and 390, which implement the cross add/subtract operations. Adder 348 performs the addition, and adder 390 performs the subtraction. Results from adders 348 and 390 are next routed to adders 388 and 392, respectively, for accumulation. Adders 388 and 392 produces the final pair of outputs.

To support the single 8-tree configuration (B), all multiplexer configuration for dual 4-tree with butterfly configuration (C) is retained. Adder 348 has the sum from all 8 multipliers, and adder 388 has the accumulated result. Output of adder 392 is simply ignored.

Figure 14:
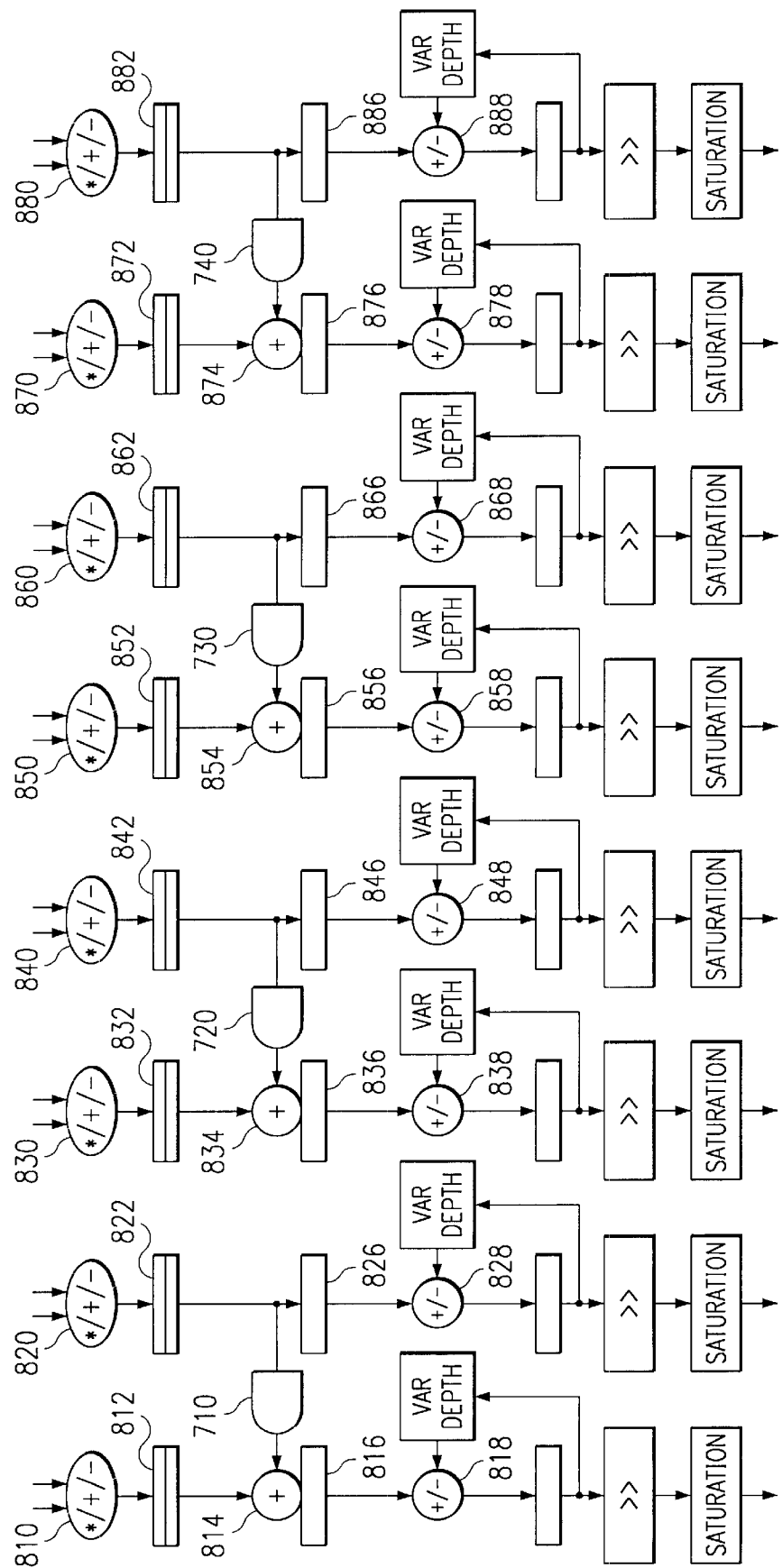
FIG. 14 illustrates a diagram of a simplified version of the IPP reconfigurable datapath architecture, which supports the previous A and D version without Pre-Add (FIGS. 8 and 12).
Figure 28:
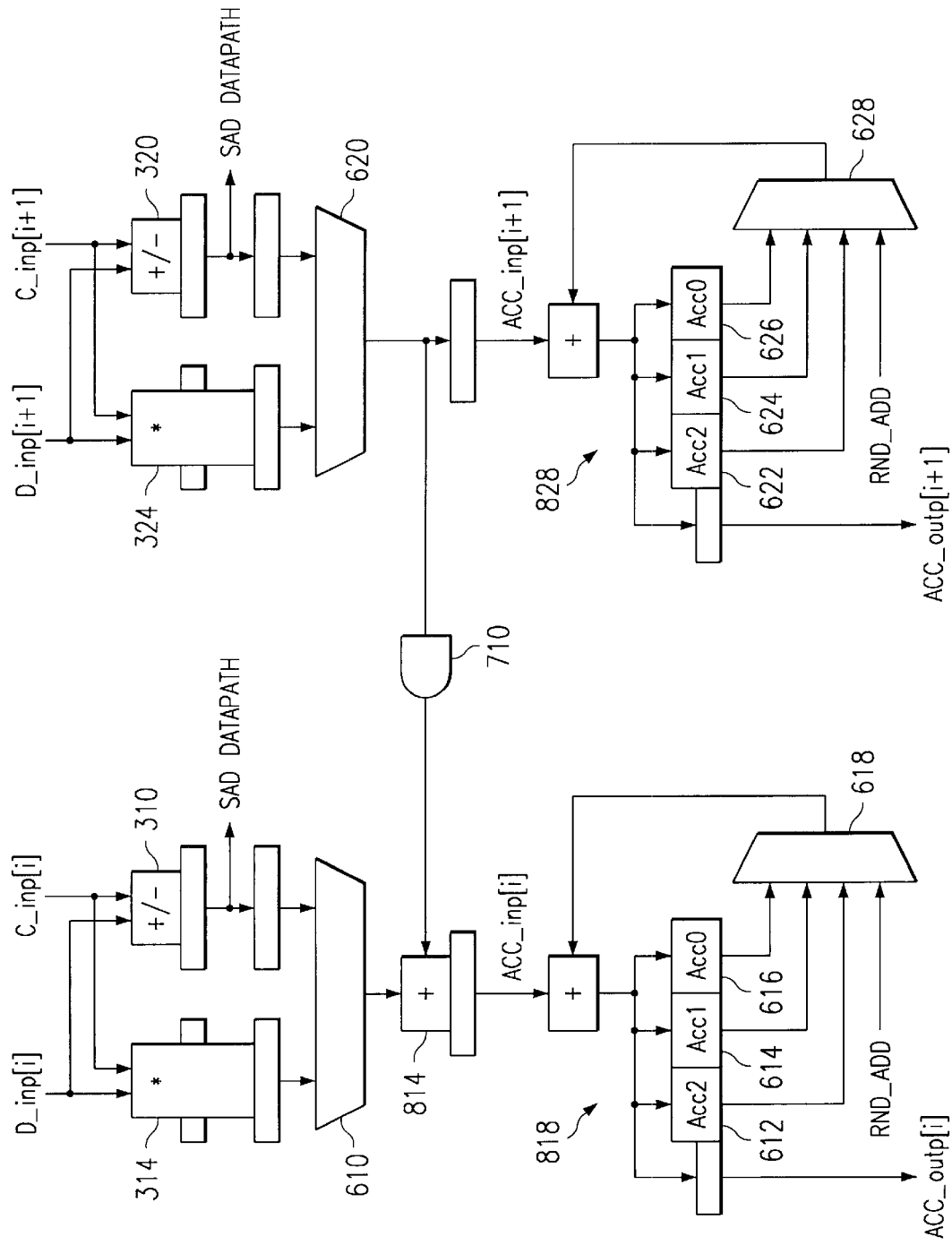
FIG. 28 illustrates two of the 8 MAC units of FIG. 14 in a more detailed drawing of components.

FIG. 14 illustrates a simplified version of reconfigurable datapath architecture. This simplified architecture supports both the parallel MACs of FIG. 8 and the quad 2-trees of FIG. 12. As is shown, instead of the separate adders and multipliers illustrated in FIGS. 8 and 13, both Data A and Data B inputs are applied to both a multiplier and an adder/subtractor (adder) and then the outputs of either the adders or multipliers are selected before going out of the multiply/add/subtract blocks 810, 820, 830, 840, 850, 860, 870, 880. A more in depth illustration of a pair of the MAC units of FIG. 14 is shown in FIG. 28. Each MAC unit is capable of performing a pipelined single cycle multiply accumulate operation on two inputs D_inp and C_inp. Accumulation of D_inp+C_inp or D_inp−C_inp instead of D_inp * C_inp is also possible, hence the add/subtract unit 310 placed in parallel with each multiplier 314. The multiplexer 610 chooses between the adder/subtractor 310 output or the multiplier 314 output. Between each pair of MAC units, there is also the quad 2-trees option(indicated by the AND gate 710) to add up the pair of results (D_inp */+/−C_inp), to produce ACC_inp, which feeds the accumulating adder 818.

As shown in FIG. 14, both of the above described configurations are implemented. Although only 8 adders (excluding those in parallel with mulipliers) are active at any given time, 12 physical adders are used in this design, in order to reduce the cost of multiplexing and routing. The AND gates 710, 720, 730 and 740 on the cross path control whether or not the */+/− results should be added together. As shown in FIG. 28, three accumulators 612, 614 and 616 are available in each MAC unit to implement upsampling. The accumulator 818 can select, via multiplexer 618, any of the three as input (with the other input being ACC_inp), or from the half-unit quantitiy for rounding, RND_ADD. On the very first cycle of valid data on ACC_inp, RND_ADD should be the selected input.

Figure 15:
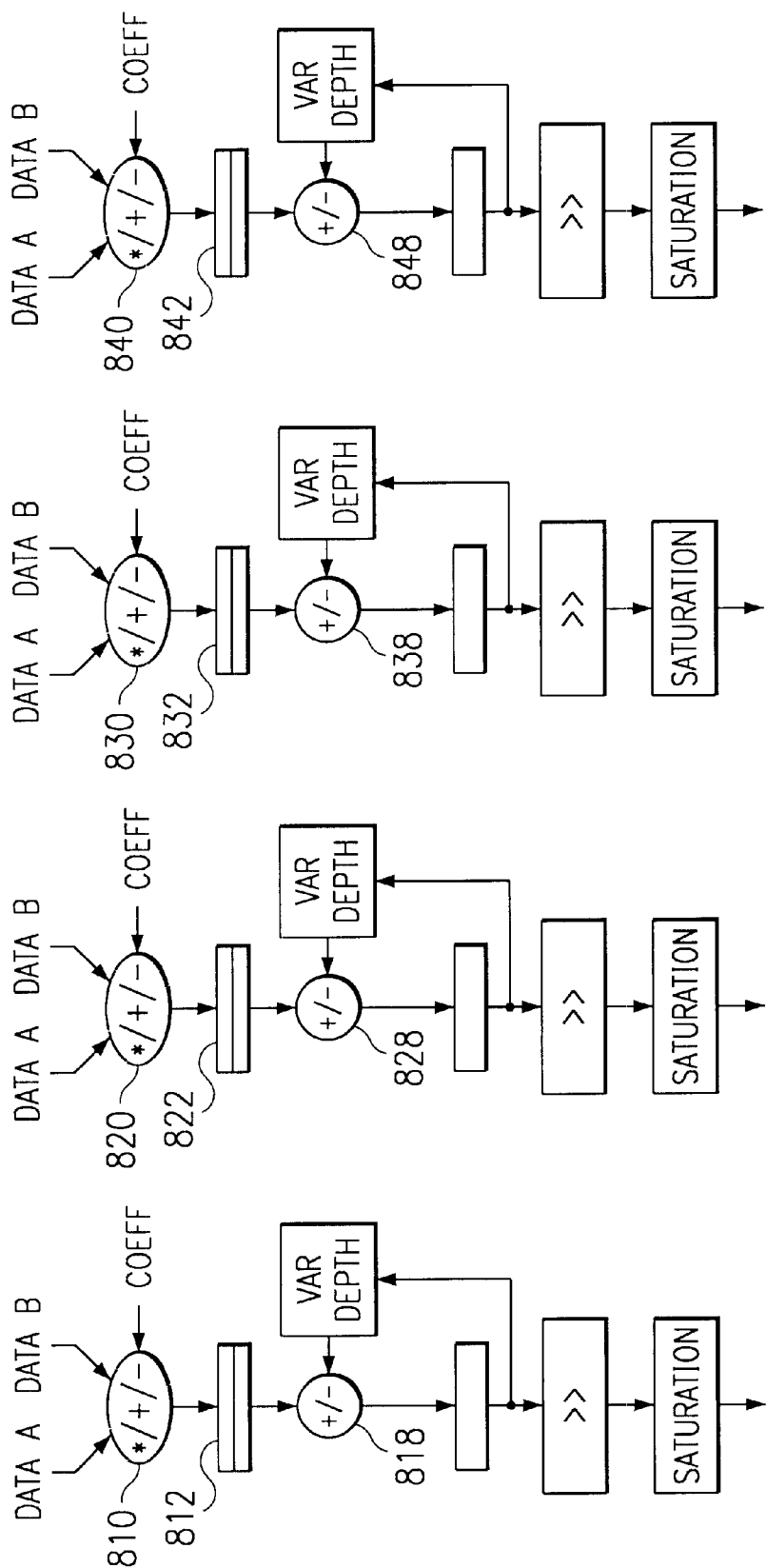
FIG. 15 illustrates a diagram of another simplified version of the IPP datapath architecture which only has 4 MACs and supports only the previous A version without Pre-Add.

Rounding and saturation follow the main arithmetic datapath. With the half-unit quantity already added to the accumulated sum, rounding is simply a right shift. FIG. 15 illustrates a more simplified version of FIG. 8 than that illustrated in FIG. 14. The configuration illustrated in FIG. 15 comprises only 4 MAC units versus 8 MAC units illustrated in previous configurations and does not contain the pre-add illustrated in FIGS. 8–14. As illustrated in FIGS. 14 and 28, FIG. 15 illustrates Data A and Data B inputs applied to both a multiplier 314 and an adder/subtractor (adder) 310 and then the outputs of the adders and multipliers are multiplexed together in multiplexers 610 and 620(Figure 28). Because there is no pre-add, post multiplexing, the outputs of the multiplexers 610 and 620 are accumulated in accumulators, 818, 828, 838 and 848. As previously described with reference to FIG. 14, and as shown in FIG. 28, three accumulators 612, 614 and 616 are available in each MAC unit to implement upsampling. The accumulator 818 can select, via multiplexer 618, any of the three as input (with the other input being ACC_inp), or from the half-unit quantitiy for rounding, RND_ADD. On the very first cycle of valid data on ACC_inp, RND_ADD should be the selected input.

In FIGS. 14 and 15, it is sometimes desirable to add absolute difference operation to the multiply/add/subtract block. This will speed up motion estimation task in video encoding applications.

Figure 16:
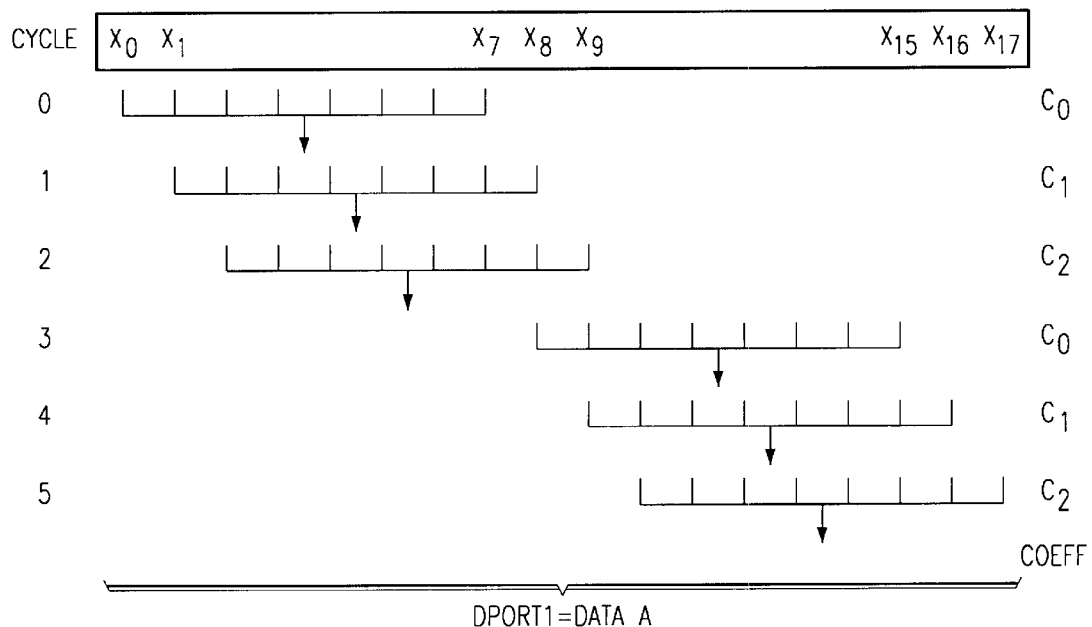
FIG. 16 illustrates the reformatting of the input coefficients to the Datapath block necessary to perform a 3-tap FIR ROW filtering according to a preferred embodiment of the invention.

FIG. 16 illustrates the input data formatting necessary to perform the IPP operation of row filtering. On the first cycle, the Data A input to all 8 MACs comprises the first 8 data words. Every cycle, the window of input data words used to feed the MACs is shifted one word to the right. Data B input of all 8 MACs is fed the same coefficient word. In this example, a 3-tap FIR filter is implemented, so three coefficient words are provided.

In the figure, X0 . . . X7 comprise the first Data A input to the MACs during a first clock cycle. Shifting by one data word, the second Data A input becomes X1 . . . X8 during a second clock cycle. The Data A inputs continue in this manner, supplying each MAC with consecutive sequence of data words. The first filter coefficient C0 is broadcast to all MACs for the first cycle. C1 is broadcast to all MACs for the second cycle, and C2 for the third cycle. At the third cycle, the MAC units have accumulated the correct outputs and can write back results to data memory. The data feed continues at X8 . . . X15 to begin to compute output Y8 . . . Y15, and the coefficient feed wraps back to C0.

Maintaining the same configuration, an alternative output is rendered when instead of supplying 8 data words and one coefficient word to the hardware, providing one data word and 8 coefficients words for the 8 filter banks. Again each Mac is working independently, multiplying the same data word with its specific coefficient word and accumulating the products. Upsampling is performed with the 8-way parallelism and optionally with the depth of each accumulator.

Figure 17:
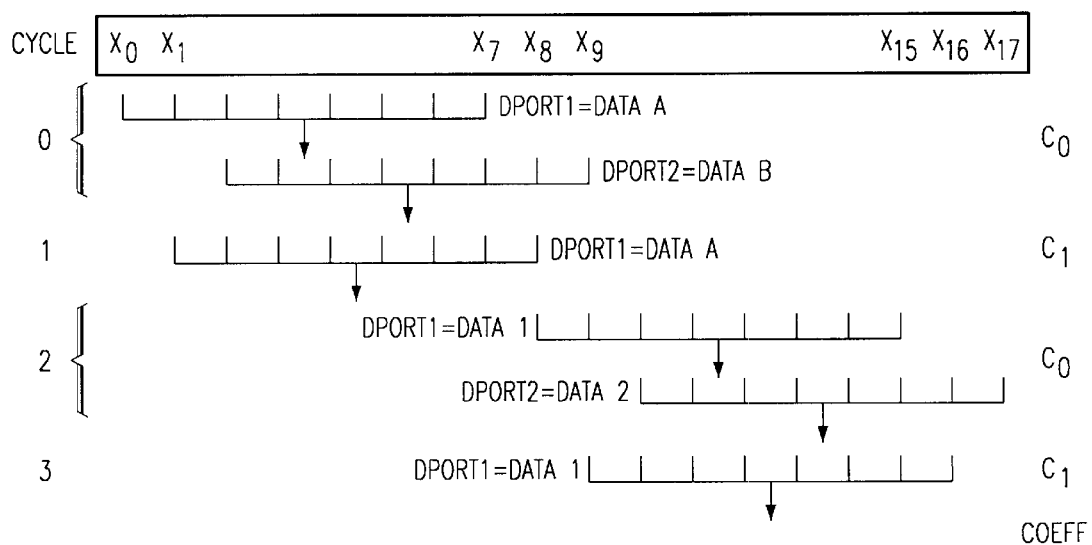
FIG. 17 illustrates the reformatting of the input coefficients to the Datapath block necessary to perform a 3-tap symmetric FIR ROW filtering according to a preferred embodiment of the invention.

FIG. 17 illustrates the input data formatting necessary to perform a symmetric row filtering operation. In this example IPP implements a 3-tap filter, so the first and third coefficients are equivalent. Therefore, only two coefficient words are provided. On the first cycle, the Data A input comprises the first 8 data words X0 . . . X7. The first Data B input comprises data words X2 . . . X9. In addition, the first coefficient supplied to all the multipliers is C0. The second Data A input is the first Data A input shifted to the right one word, or X1 . . . X8. The second Data B input is the same 8 data words. Coefficient C1 is supplied to all the multipliers on the second cycle. Effectively, IPP computes $$C0*(X0+X2)+2*C1*X1 \text{ on the first MAC,}$$

$$C0*(X1+X3)+2*C1*X2 \text{ on the second MAC,}$$

and so on. Let the desired filter coefficients be F0, F1, F2, where F0=F2. The supplied coefficients should relate to the desired coefficients by

C0=F0

C1=0.5*F1

At the end of the second cycle, the 3-tap filter outputs are ready to be stored back to data memory. On the third cycle, the Data A input is supplied with data words X8 . . . X15, Data B input is supplied with X10 . . . X17, and coefficient is wrapped back to C0.

Figure 18:
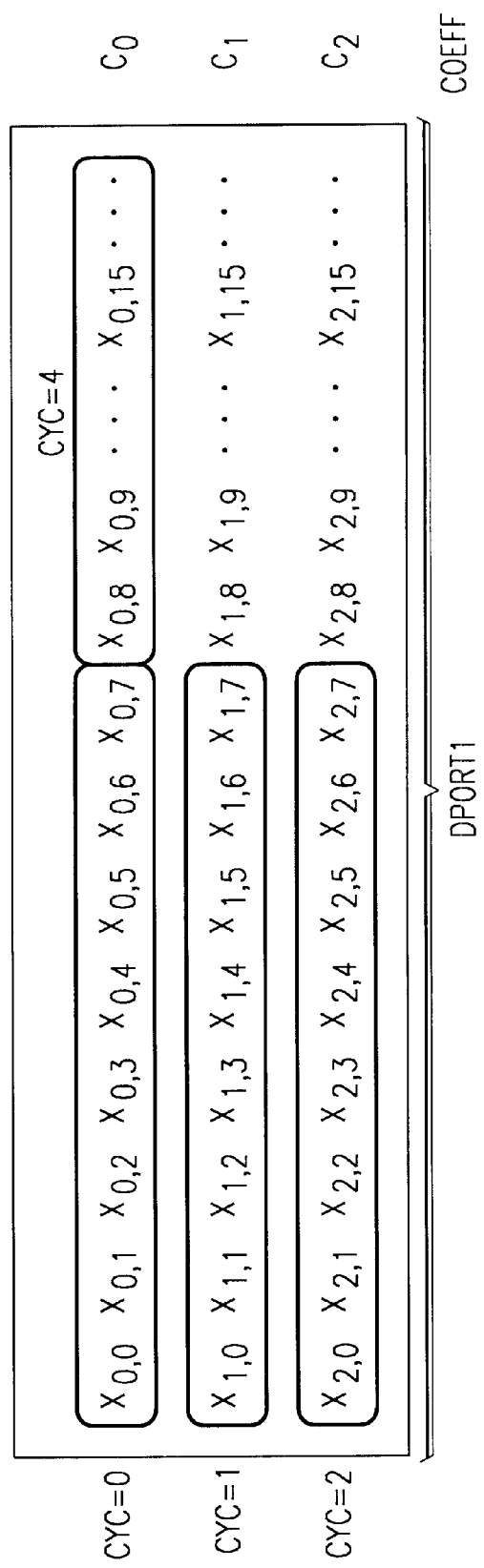
FIG. 18 illustrates from where, in the memory, the input coefficients are read and whereto the output coefficients are written, necessary to perform a 3-tap FIR column filtering according to a preferred embodiment of the invention.

FIG. 18 illustrates where from in memory the data comes to perform a column filter operation. The computational model and command syntax is similar to the row filter computational model and command syntax, except that data is stored in row-major order, and inner products are performed along columns. For best efficiency, data, coefficient and output arrays should all be aligned to a 8×16 bit memory word. As is shown in FIG. 18, in this case the already aligned data is taken directly from memory word to the datapath. In other words, no input formatting of the data is necessary. Each coefficient is applied to all 8 MAC units in the parallel MACs configuration shown in FIGS. 8 and 10 through 13. An N-tap column filter takes N+1 cycles to produce 8 outputs. There are N memory reads and 1 data memory writes in each N+1 cycles. When N>8, there is one coefficient memory read every 8 cycles. Otherwise there is an initial read then all subsequent coefficients are supplied by the register in input formatter; no further read is needed. Coefficient read frequency is the same as in row filtering, 1 read/8 cycles if N>8, and is zero otherwise.

Figure 19:
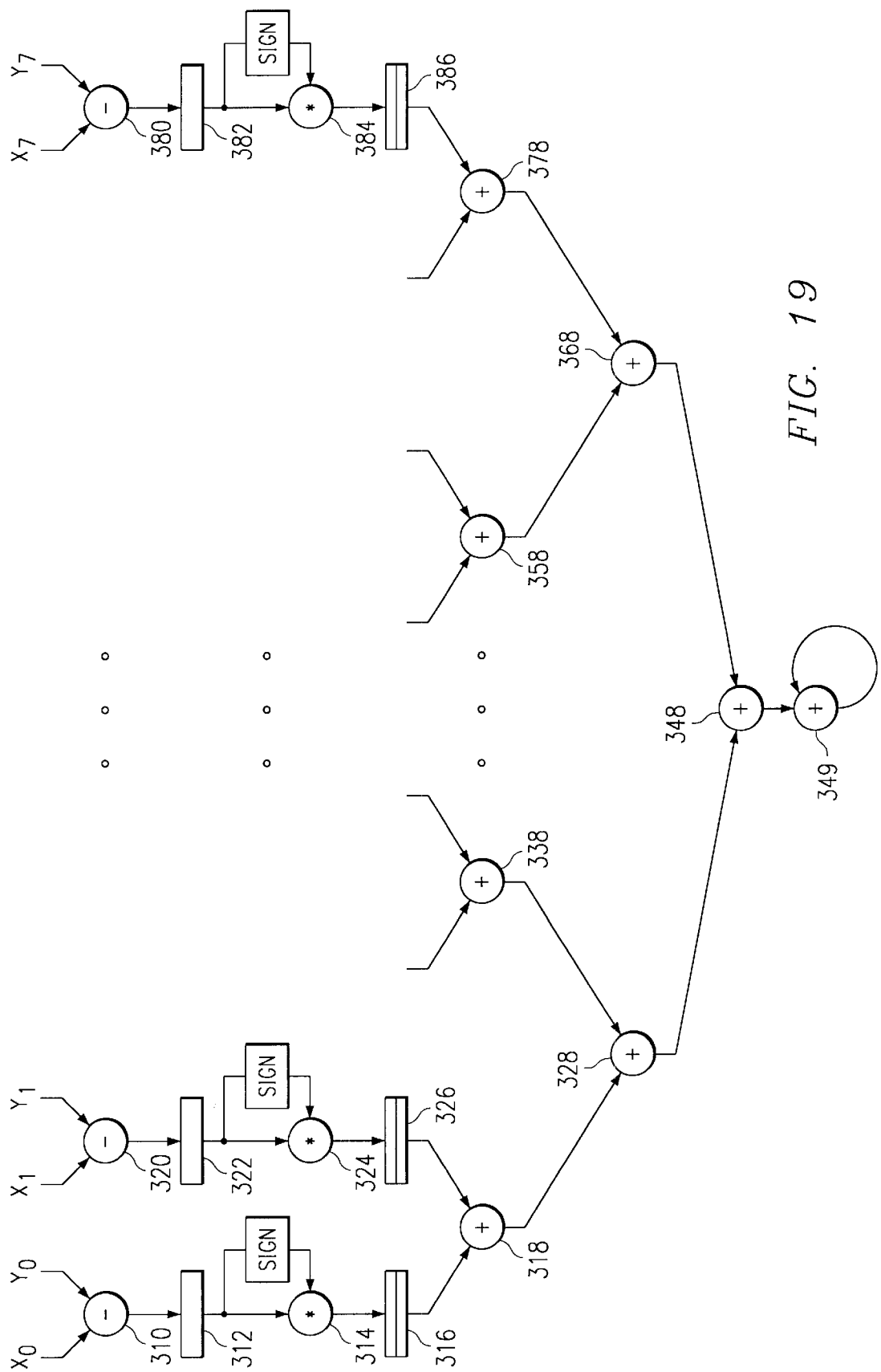
FIG. 19 illustrates a schematic of the data path block with a tree adder when the IPP is performing a sum of absolute differences operation according to a preferred embodiment of the invention.

FIG. 19 illustrates the IPP configuration necessary to perform the sum of absolute differences used to enhance the performance of video encoding. As shown in FIG. 19, Data A comprises X0 . . . X7 and Data B comprises Y0 . . . Y7. Coefficient words are not required. The difference between each Data A input and each Data B input is calculated in subtractors 310, 320, 330, 340, 350, 360, 370 and 380 and those differences are stored in registers 312, 322, 332, 342, 352, 362, 372 and 382. That difference is then multiplied by either a plus or a minus sign depending upon whether the difference is positive or negative in multipliers 314, 324, 334, 344, 354, 364, 374 and 384, in order to yield a positive number. Those products are stored in registers 316, 326, 336, 346, 356, 366, 376 and 386 then summed in adders 318, 328, 358 and 378 and those sums summed in adders 328, 348 and 368. The sum of adder 348 is then accumulated in accumulator 349. For the sum of absolute differences we operate on 8-bit pixels, so the adders only have to be 12-bits wide, except for the final accumulator, which must be 16 bits wide. Saturation thresholds and rounding parameters can come from yet another bank of registers.

Figure 20:
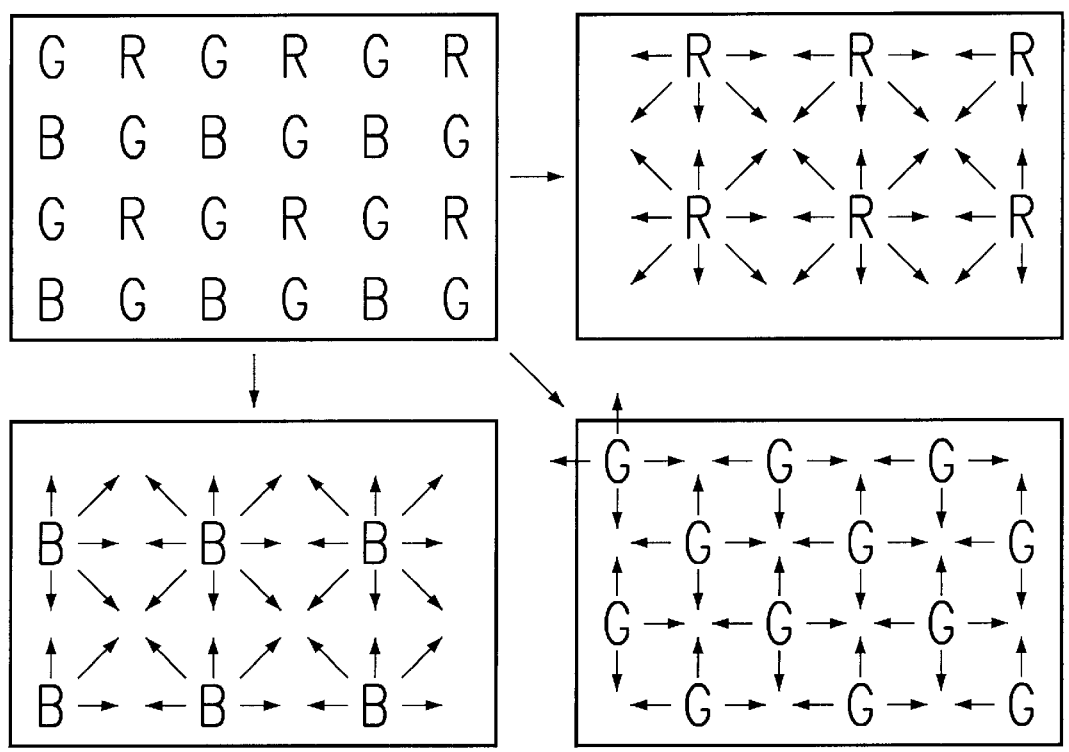
FIG. 20 illustrates the lesser density of the Red and Blue colors versus the Green color involved in a demosaic operation.
Figure 21:
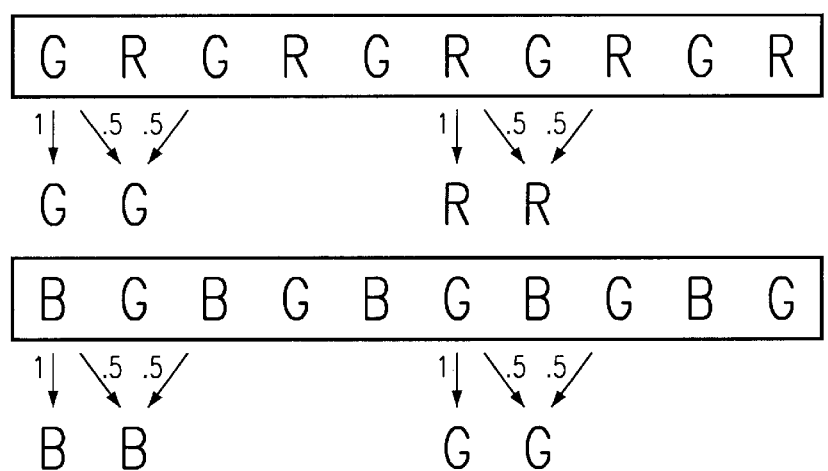
FIG. 21 illustrates the reformatting of the data necessary to perform a ROW pass portion of the demosaic operation according to a preferred embodiment of the invention.

FIGS. 20, 21 and 22 illustrate the IPP operation of Discrete Sine/Cosine Demosaicing including the steps of Row Pass and Column Pass. Most digital still cameras employ color filter array in the imager that produces interleaved color information. Demosaicing is the process to obtain the missing color component from available neighboring same-color components. Simple linear interpolation approach is often used, which can be represented by the diagram illustrated in FIG. 20. The weights are either 0.5 or 0.25, depending upon whether there are 2 or 4 closest same-color neighbors (excluding boundary conditions).

The three colors are processed separately, with red processing essentially the same as blue. Each color is processed in two passes, a row pass and a horizontal pass. The row pass is graphically represented in FIG. 21. From each green/red line, one full green line and one full red line is generated. For the green component, row pass filtering is implemented by a 2-phase, 3-tap filter, with coefficients (0.5, 0, 0.5) and (0, 1, 0) for the two phases. For the red component, row pass filtering is implemented by the same 2-phase, 3-tap filter, with coefficients (0, 1, 0) and (0.5, 0, 0.5). Each blue/green line is processed similarly to generate a full blue line and a full green line.

Producing two color output rows from one row should be merged into one command, using up-sampling-like looping. It takes 6 cycles to process 8 input pixels. For each group of 6 cycles, there is one data memory read, two data memory writes, and three coefficient memory reads.

Figure 22A:
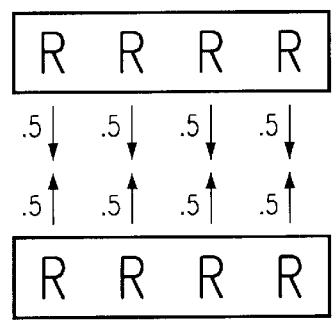
FIGS. 22a and 22b together illustrate the reformatting of the data necessary to perform a COLUMN pass portion of the demosaic operation according to a preferred embodiment of the invention.

The implementation of column pass for demosaic red/blue components is illustrated in FIG. 22a. For read and blue colors, two tap column filtering is used. It takes three cycles to process 8 input pixels during which there are two data memory reads, 1 data memory writes, and there are no steady-state coefficient memory reads.

Figure 22B:
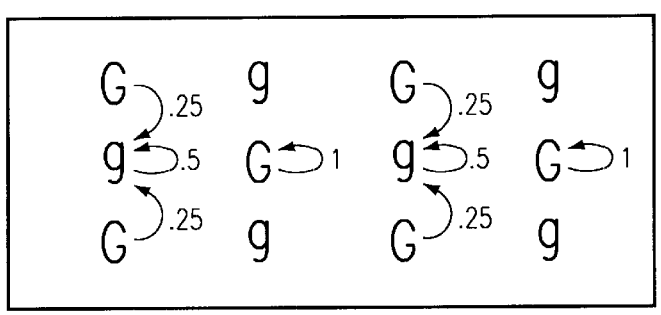

The implementation of column pass for demosaic green components is illustrated in FIG. 22b. For the green color component, 2-phase 3-tap column filtering is used, with coefficients (0.25, 0.5, 0.25) and (0, 1, 0). Eight input pixels are processed in 4 cycles. There are three data memory reads, one data memory write, and zero coefficient memory reads per group of 4 cycles.

In sum, 11 cycles are spent for the interpolation scheme of demosaic for 8 input pixels. Out of 13 cycles, 6 data memory reads, 4 data memory writes and 3 coefficient memory reads are performed.

Figure 23:
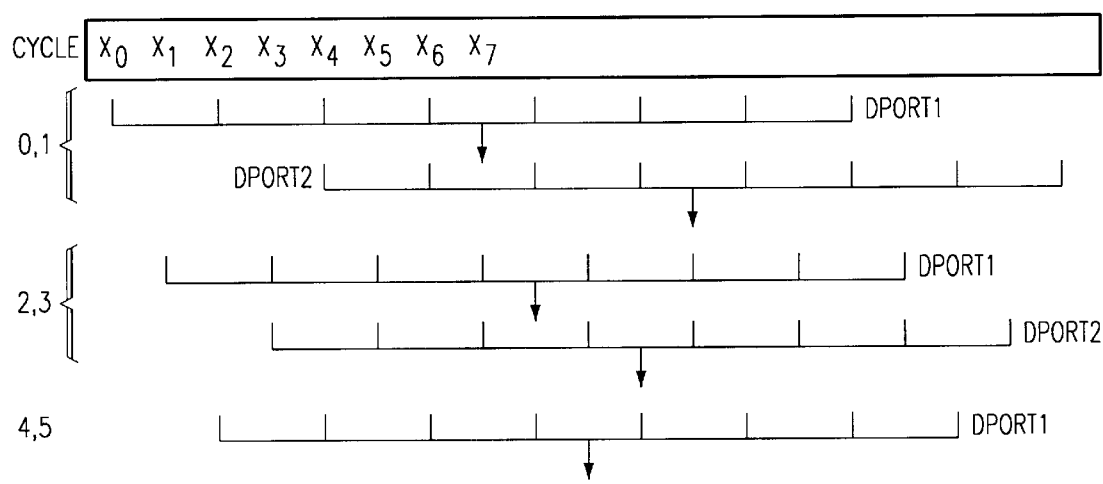
FIG. 23 illustrates the reformatting of the input data necessary to perform row-wise wavelets transform, similar to symmetric ROW filtering, according to a preferred embodiment of the invention.

FIG. 23 illustrates the formatting of the input data to perform the IPP operation of wavelets, row pass. In image technology, wavelets are used for image compression/decompression and feature extraction, for example, as a pre-processing stage for textural features. The wavelets operation can be implemented on any of the parallel 8 MAC configurations illustrated in FIGS. 8 and 10–13 or the more simplified versions of FIGS. 14 and 15. The row pass of wavelets analysis is implemented as 2x upsampling, 2x downsampling (to achieve high/low frequency banks), row filtering.

Figure 24:
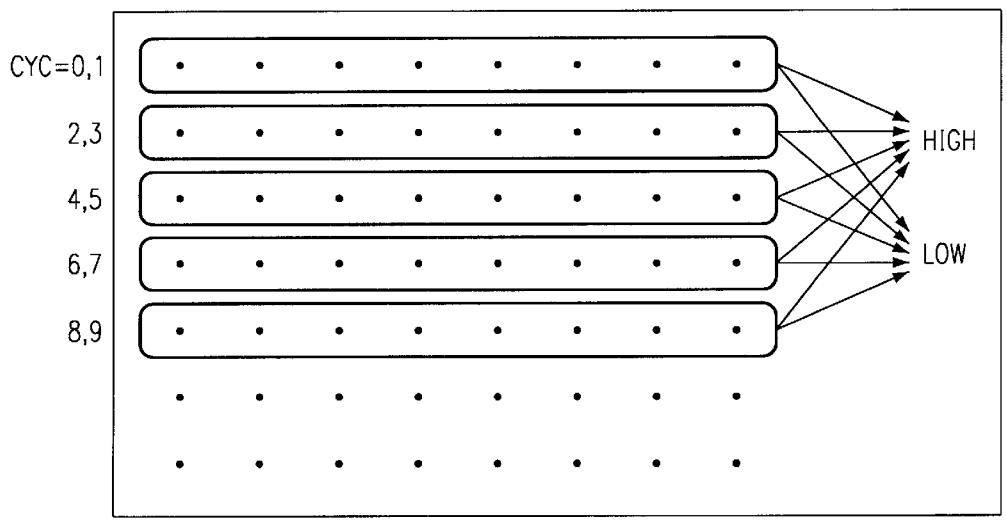
FIG. 24 illustrates the reformatting of the input data necessary to perform column-wise wavelets transform, similar to column filtering, according to a preferred embodiment of the invention.

FIG. 24 illustrates where from, in memory, the input data comes, in order to perform the column pass portion of the wavelet operation. The column pass is treated as 2x upsampling, 2x downsampling, column filtering. Again, data, coefficient and output arrays should all be aligned to a 8×16 bit memory word. As is shown in FIG. 18, data is taken directly from memory word to the datapath. In other words, no input formatting of the data is necessary. Each coefficient is applied to all 8 MAC units in the parallel MACs configuration shown in FIGS. 8 and 10 through 13 or to the four MAC units illustrated in FIGS. 14 and 15. It takes N+1 cycles to produce 8 outputs, where N is the number of filter taps in the wavelets kernel. There are N memory reads and 1 data memory writes in each N+1 cycles. Coefficient read frequency is the same as in row filtering, 1 read/8 cycles if N>8, and is zero otherwise. For wavelet reconstruction, separately process high and low frequency banks with 2x upsampling filters. Finally, combine the two banks using vector addition.

Figure 25:
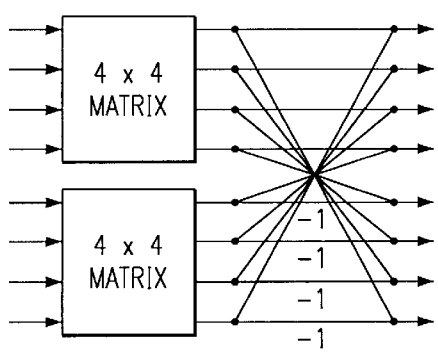
FIG. 25 illustrates the post-multiplier adders of a split adder tree with butterfly configuration (C, FIG. 11) necessary to implement the cross additions and subtractions of the row-wise Inverse Discrete Cosine Transform(IDCT).
Figure 26:
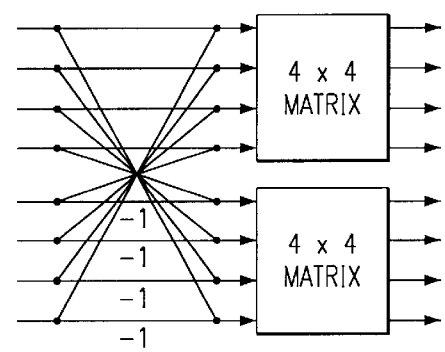
FIG. 26 illustrates the pre-multiply adders of a split adder tree with butterfly configuration (C, FIG. 11) with the butterfly disabled necessary to implement the cross additions and subtractions of the row-wise Discrete Cosine Transform (DCT).

FIG. 25 illustrates the IPP operation of Indirect Cosine Transform (IDCT) in a row pass format. As shown, row-pass IDCT is implemented with the full matrix-vector approach. Thirty-two multiplications are used for each 8-point transform. Although not seemingly very efficient, a straightforward application of the IPP. Any one of the 8 MAC configurations shown in FIGS. 8 or 10–15 can be used to perform this operation, but the configuration of the split adder trees with butterfly shown in FIG. 11 is preferred. This configuration can take advantage of symmetry in the transform to reduce the number of multiplications by half. In this case the IPP uses the post-multiply/adders to implement the cross additions/subtractions. One input dataword is pulled from the wide memory word per cycle, and 8 coefficient words are used per cycle. Each 8-point transform takes 4 cycles to process. During these 4 cycles, one data memory read, one data memory write and 4 coefficient memory reads are performed. If the butterfly stage of reconfiguration is omitted (for example in FIGS. 14 and 15), the full 8-by-8 matrix multiplication method has to be used, resulting in 64 multiplications per 8 point transform, and taking 8 or 16 cycles to perform each transform (with 8 or 4 MACs in IPP) FIG. 26 illustrates the IPP operation of Direct Cosine Transform (DCT) in a row pass format. Similar to the row-pass IDCT, row-pass DCT can be implemented with 32 multiplications or with 64 multiplications, depending on the configurability of IPP. When the dual 4-tree with pre-multiply adders configuration (FIG. 11) is available, it should be used. The butterfly stage is disabled in this case. All 8 data words from each memory word are applied to the MACs, one to each. Coefficients are applied the same way, one different coefficient to each MAC. It takes 4 cycles to process one 8-point transform in this configuration. Without the pre-multiply adders (for example in FIGS. 14 and 15), each 8-point transform will require 64 multiplications, and take 8 or 16 cycles depending on the number of MACs in the IPP.

Figure 27:
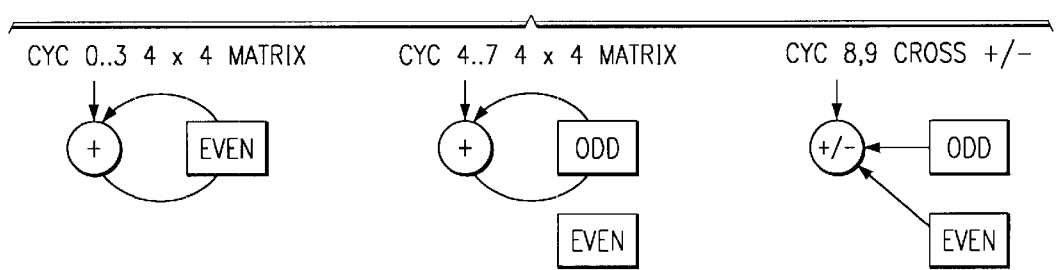
FIG. 27 illustrates the column-wise IDCT and DCT implemented in SIMD mode of operation, similar to the column FIR filtering.

FIG. 27 illustrates the IPP operation of IDCT in column format Single Instruction Multiple Data(SIMD). The parallel configuration of 8 MACs shown in FIGS. 8 with some modifications in the accumulators is needed to take advantage of symmetry in the transform. Each MAC unit requires 8 accumulators, and each accumulating adder needs to take both inputs from the 8 accumulators. With such hardware capability, during the first 4 cycles, one 4×4 matrix will yield the first 4 points. During the next 4 cycles, another 4×4 matrix will produce the next 4 points. During cycles 9 and 10, the accumulating adders cross add/subtract and combine the outputs. Therefore, in 10 cycles, a pair of output results, 16 points are produced. During those 10 cycles, 8 data reads, 2 data writes and 8 coefficient reads are performed. Without the hardware modification, it takes 64 multiplications per 8-point transform, so 16 points of output will take 16 cycles on 8-MAC version of IPP, and 32 cycles on 4-MAC version of IPP. In either case the separate MAC configuration is used.

In addition to the datapath configurability and input formatting options, an efficient control and address generation scheme is devised for IPP. This scheme reduces the implementation cost of hardware control, and provides easy-to-use programming model for IPP.

All computation shall occur inside a nested for loop. Timing for accumulator initialization and write out shall be controlled by conditioning on the loop variables. Initialization shall happen when certain loop variables match with their beginning values. Write out shall happen when the same set of variables match with their ending values. Circulating accumulators can be specified with the innermost loop count indexing the accumulators. All address increments for input data, coefficients, and results, can be specified in terms of "when" and "how much", and the "when" is associated with the loop variables. The following is psuedo-code of a skeleton of control structure for IPP that illustrates these concepts.

```
dptr = dptr_init;   /* initial value of pointers */
cptr = cptr_init;
optr = optr_init;
for (i1=0; i1<=lp1end; i1++) {
    for (i2=0; i2<=lp2end; i2++) {
        for (i3=0; i3<=lp3end; i3++) {
            for (i4=0; i4<=lp4end; i4++) {
                /* memory read and input formatting */
                x[0 ... 7] = dptr[0 ... 7];
                    /* or dptr[0], dptr[0, 1], dptr[0, 1, 2, 3] distributed */
                y[0 ... 7] = cptr[0 ... 7];
                    /* or cptr[0], cptr[0, 1], etc */
                /* accumulator initialization */
                if (initialize_acc)
                    acc[i4*accmode] [0 ... 7]= rnd_add[0 ...7];
                /* operation-accumulate */
                acc[i4*accmode] [0 ... 7] += x[0 ... 7] op y[0 ... 7];
                /* write back */
                if (write_back)
                    optr[0 ... 7] = saturate_round(acc[i4*accmode]
                        [0 ... 7]));
                            /* or just 1, 2, or 4 outputs */
                /* pointer updates */
                dptr += ... ;
                cptr += ... ;
                optr += ... ;
            }
        }
    }
}
```

The initialize_acc condition is tested by matching a specified subset of loop count variables with the beginning values (0). The parameter acc_loop_level indicates whether none, i4, i4 and i3, or i4, i3 and i2 should be tested. This same subset of loop count variables are tested against their ending values to supply the write_back condition.

The pointer updates also involve comparing loop count variables. For example, for 4 level of loops we can supply up to 4 sets of address modifiers for the data pointer, dptr. Each set consists of a subset of loop count variables that must match with their ending value, and the amount in which dptr should be incremented when the condition is true. The same capability is given to coefficient pointer cptr and output pointer optr.

In the above pseudo-code, the parameters are used which are either statically set with Write_parameters command or are encoded in an IPP computational command. These parameters includes the ending values of loop count variables (beginning value is always 0), accmode (single/circulating accumulators), op (multiply/add/subtract/absdiff), acc_loop_level and the address modifiers mentioned above.

All the supported imaging/video functions can be written in the above form and then translated into IPP commands by properly setting the parameters. The task of software development for IPP can follow this methodalogy.

We claim:

1. An image processing peripherial comprising:

a plurality of pairs of multiply accumulate circuits connected in parallel, each pair of multiply accumulate circuits comprising;

first adder pairs, each one of each adder pair having first and second inputs receiving respective first and second inputs having a first predetermined number of bits and an output producing a sum or a difference of said inputs;

first multiplier pairs, corresponding to said first adder pairs, each multiplier of each multiplier pair having a first input of said sum or difference of said first adders and a second input of a constant predetermined number and producing a product output;

second adder pairs, corresponding to said first multiplier pairs, each one adder of said adder pair having first and second inputs receiving respective first multiplier outputs from one or the other of said multipliers of said corresponding multiplier pair as said first input and wherein said one of said pair of second adders receives an output from a first multiplexer, said first multiplexer having one input from a product of the other multiplier of said first multiplier pairs and a second input from an accumulated sum of said one adder of said second adder pairs as a second input of said one adder of said second adder pair and;

wherein said other of said pair of second adders receives outputs from a second and a third multiplexer, said second multiplexer having one input from said other multiplier of said first multiplier pair and a second input from the sum of said one adder of said second adder pair, said third multiplexer having one input from the accumulated sum of said other adder of said second adder pair and a second input from the sum of a one adder of a second pair of second adder pairs, and;

wherein each second adder of said second adder pairs produces a sum output according to selection made by said first, second and third multiplexers.

2. An image processing peripheral comprising:

eight first adders, each first adder having first and second inputs receiving respective first and second input signals and an output producing a selected one of a sum of said inputs or a difference of said inputs;

eight multipliers, each multiplier having a first input connected to said output of a corresponding on of said N first adders, a second input receiving a coefficient input signal and a product output producing a product of said inputs;

eight second adders, each second adder having first and second inputs and an output producing a selected one of a sum of said inputs or a difference of said inputs, said first input of said first, third, fifth and seventh second adders connected to said product of a corresponding multiplier;

eight sum temporary registers, each sum temporary register having an input connected to said output of a corresponding one of said second adders and an output, each sum temporary register temporarily storing said output of said corresponding second adder;

said second input of said eighth second adder connected to said output of said eighth sum temporary register;

a first multiplexer having a first input connected to said output of said first sum temporary register, a second input connected to said product output of said second multiplier and an output connected to said second input of said first second adder, said first multiplexer connecting a selected one of said first input or said second input to said output;

a second multiplexer having a first input connected to said output of said second sum temporary register, a second input connected to said output of said third sum temporary register and an output connected to said second input of said second second adder, said second multiplexer connecting a selected one of said first input or said second input to said output;

a third multiplexer having a first input connected to said output of said third sum temporary register, a second input connected to said product output of said fourth multiplier and an output connected to said second input of said third second adder, said third multiplexer connecting a selected one of said first input or said second input to said output;

a fourth multiplexer having a first input connected to said output of said fourth sum temporary register, a second input connected to output of said sixth sum temporary register and an output connected to said second input of said fourth second adder, said fourth multiplexer connecting a selected one of said first input or said second input to said output;

a fifth multiplexer having a first input connected to said output of said fifth sum temporary register, a second input connected to said product output of said sixth multiplier and an output connected to said second input of said fifth second adder, said fifth multiplexer connecting a selected one of said first input or said second input to said output;

a sixth multiplexer having a first input connected to said output of said sixth sum temporary register, a second input connected to said output of said seventh sum temporary register and an output connected to said second input of said first second adder, said sixth multiplexer connecting a selected one of said first input or said second input to said output;

a seventh multiplexer having a first input connected to said output of said seventh sum temporary register, a second input connected to said product output of said eighth multiplier and an output connected to said second input of said first second adder, said seventh multiplexer connecting a selected one of said first input or said second input to said output;

a eighth multiplexer having a first input connected to said output of said first sum temporary register, a second input connected to said product output of said second multiplier and an output connected to said second input of said first second adder, said eighth multiplexer connecting a selected one of said first input or said second input to said output;

a ninth multiplexer having a first input connected to said output of said second sum temporary register, a second input connected to said product output of said fourth multiplier and an output connected to said second input of said fourth second adder, said ninth multiplexer connecting a selected one of said first input or said second input to said output;

a tenth multiplexer having a first input connected to said output of said fifth sum temporary register, a second input connected to said product output of said sixth multiplier and an output connected to said second input of said sixth second adder, said tenth multiplexer connecting a selected one of said first input or said second input to said output;

an eleventh multiplexer having a first input connected to said output of said sixth sum temporary register, a second input connected to said product output of said eighth multiplier, a third input connected to said fourth sum temporary and an output connected to said second input of said sixth second adder, said tenth multiplexer connecting a selected one of said first input, said second input or said third to said output;

a third adder having a first input connected to said second sum temporary register, a second input connected to said sixth sum temporary register and an output producing a selected one of a sum of said inputs or a difference of said inputs;

a fourth adder having a first input connected to said output of said third adder, a second input and an output producing a selected one of a sum of said inputs or a difference of said inputs;

a ninth sum temporary register having an input connected to said output of said fourth adder and an output connected to said second input of said fourth adder, said ninth sum temporary register temporarily storing said output of said fourth adder; and nine image processing peripheral outputs, each output connected to a corresponding one of said sum temporary registers.

3. The image processing peripheral of claim 2, further comprising:

eight second sum temporary registers, each second sum temporary register having an input connected to said output of a corresponding first adder and an output connected to said first input of a corresponding multiplier, each second sum temporary register temporarily storing said output of said corresponding first adder.

4. The image processing peripheral of claim 2, further comprising:

eight pipeline registers, each pipeline register having an input connected to said output of a corresponding multiplier, and an output, said output of said first pipeline register connected to said first input of said first second adder, said output of said second pipeline register connected to said second input of said eighth multiplexer, said output of said third pipeline register connected to said first input of said third second adder, said output of said fourth pipeline register connected to said second input of said ninth multiplexer, said output of said fifth pipeline register connected to said first input of said fifth second adder, said output of said sixth pipeline register connected to said second input of said tenth multiplexer, said output of said seventh pipeline register connected to said first input of said seventh second adder and said output of said eighth pipeline register connected to said second input of said eleventh multiplexer.

5. The image processing peripheral of claim 2, further comprising:

nine variable depth accumulators, each accumulator having a first input connected to said output of a corresponding sum temporary register and an output for temporarily storing at least three outputs of said corresponding sum temporary register, said outputs of said first to seventh variable depth accumulators connected to said first input of a corresponding multiplexer, said output of said eighth variable depth accumulator connected to said second input of said eighth second adder and said output of said ninth variable depth accumulator connected to said second input of said fourth adder.

6. The image processing peripheral of claim 4, further comprising:

nine right shifters, each right shifter having an input connected to said output of a corresponding sum temporary register and an output connected to a corresponding image processing peripheral output, each right shifter right shifting said input.

7. The image processing peripheral of claim 2, further comprising:

nine saturation units, each saturation unit having an input connected to said output of a corresponding sum temporary register and an output connected to a corresponding image processing peripheral output, each saturation unit outputting a first saturation value if said input is greater than an upper threshold and a second saturation value if said input is less than a lower threshold.

8. The image processing peripheral of claim 2, further comprising:

nine right shifters, each right shifter having an input connected to said output of a corresponding sum temporary register and an output, each right shifter right shifting said input; and nine saturation units, each saturation unit having an input connected to said output of a corresponding right shifter and an output connected to a corresponding image processing peripheral output, each saturation unit outputting a first saturation value if said input is greater than an upper threshold and a second saturation value if said input is less than a lower threshold.

* * * * *